United States Patent [19]
Reed

[11] Patent Number: 5,499,892
[45] Date of Patent: Mar. 19, 1996

[54] APPARATUS FOR REPAIRING CRACKS

[75] Inventor: Gary J. Reed, Turlock, Calif.

[73] Assignee: Lock-N-Stitch International, Turlock, Calif.

[21] Appl. No.: 174,121

[22] Filed: Dec. 17, 1993

Related U.S. Application Data

[63] Continuation-in-part of Ser. No. 77,854, Jun. 16, 1993, Pat. No. 5,379,505.

[51] Int. Cl.⁶ .............................. F16B 31/00; F16B 39/28
[52] U.S. Cl. ...................... 411/5; 29/402.17; 29/888.011; 411/187; 411/399; 411/424
[58] Field of Search ...................................... 411/1–5, 411, 411/412, 414, 424, 426, 399, 184, 185, 187, 956; 29/402.17, 888.011

[56] References Cited

U.S. PATENT DOCUMENTS

| | | |
|---|---|---|
| 154,864 | 9/1874 | Harvey . |
| 2,011,484 | 8/1935 | Harman . |
| 2,121,692 | 6/1938 | Hays . |
| 2,291,162 | 7/1942 | Kirby . |
| 2,361,701 | 10/1944 | Michaels . |
| 2,506,233 | 5/1950 | Murphy . |
| 2,649,650 | 8/1953 | Javor . |
| 2,951,506 | 9/1960 | Diperstein .................................. 138/99 |
| 2,998,645 | 9/1961 | Diperstein . |
| 3,066,400 | 12/1962 | Forsythe . |
| 3,295,580 | 1/1967 | Waltermire ........................... 411/187 X |
| 3,660,233 | 5/1972 | Dalke et al. . |
| 4,599,781 | 7/1986 | Diperstein ............................ 29/402.11 |
| 4,662,806 | 5/1987 | Reed ............................................. 411/2 |
| 4,824,279 | 4/1989 | Casazza .................................. 403/294 |
| 4,845,828 | 7/1989 | Reed . |
| 4,892,429 | 1/1990 | Giannuzzi ................................ 411/383 |

FOREIGN PATENT DOCUMENTS

| | | |
|---|---|---|
| 154074 | 11/1953 | Australia . |
| 456481 | 4/1950 | Italy . |
| 350141 | 6/1931 | United Kingdom . |

*Primary Examiner*—S. Thomas Hughes
*Attorney, Agent, or Firm*—Bernhard Kreten

[57] ABSTRACT

A pin is provided for repairing cracks in a material such as iron casting materials. The pin includes threads with both upper surfaces and lower surfaces which angle upwards toward a head of the pin. A tapping bit is utilized in a hole of similar diameter to the pin, positioned with half of the hole on each side of a crack, the bit creating threads in the hole which are substantially complemental to the threads of the pin. The pin includes a shoulder which has a greater diameter than a diameter of the hole. A neck is located between the head of the pin and the shoulder of the pin having a lesser diameter than any other portion of the pin. When the pin is threaded into the hole, the shoulder abuts against a surface of the cracked material causing the pin to cease translation into the material. Upon further rotation of the pin, the upwardly angled threads draw opposite sides of the crack towards each other. Before a torsional load can be applied to the pin which would damage the threads, the head shears off at the neck. A threaded portion of the pin thus remains within the hole holding sides of crack tightly together.

12 Claims, 15 Drawing Sheets

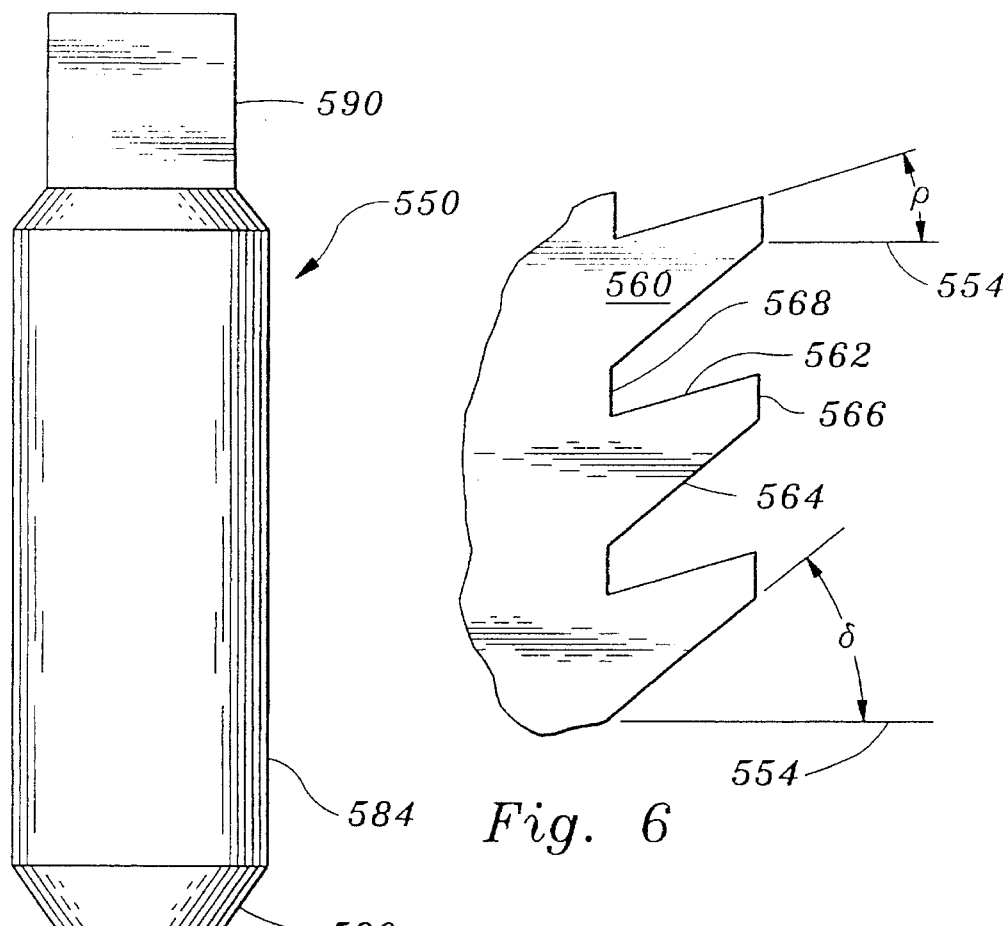
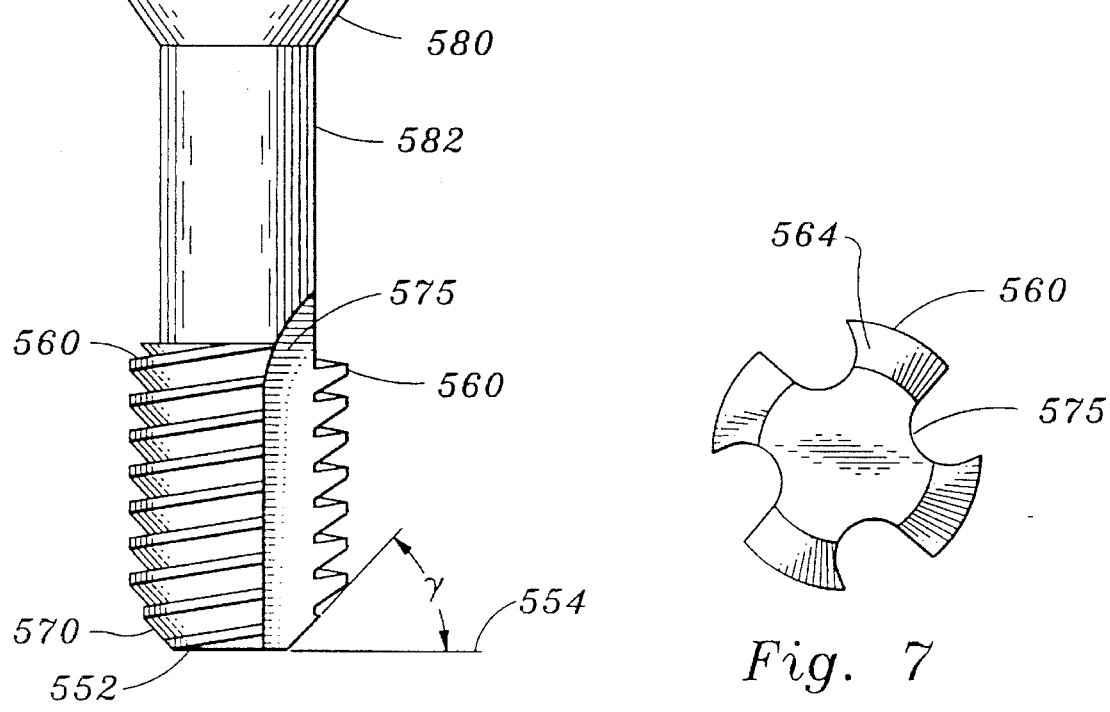
Fig. 5
Fig. 6
Fig. 7

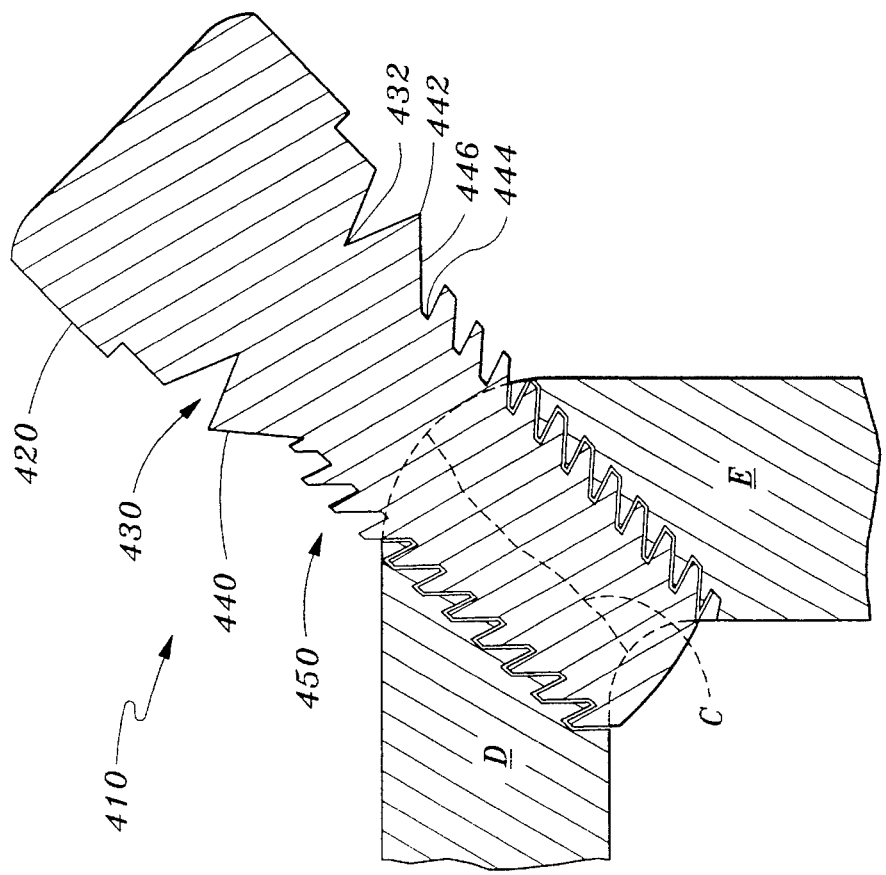
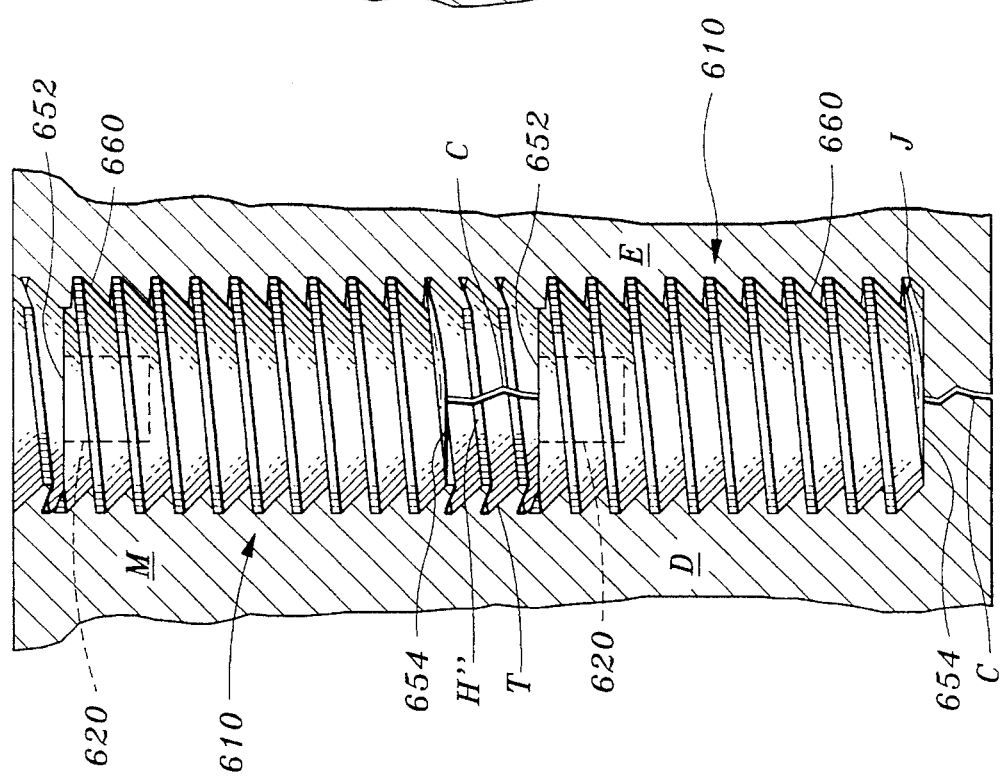

APPARATUS FOR REPAIRING CRACKS

CROSS REFERENCE TO RELATED APPLICATION

This is a continuation-in-part of application Ser. No. 08/077,854, filed Jun. 16, 1993, now U.S. Pat. No. 5,379,505.

FIELD OF THE INVENTION

The following invention relates to methods and devices for repairing cracks in materials. More specifically, the present invention relates to methods and devices for crack repair in casted parts by drilling holes in the crack, threading the holes and screwing threaded pins into the holes, especially pins having threads which extend outward away from a central axis of the pin and upward, toward a head of the pin.

BACKGROUND OF THE INVENTION

Materials often exhibit a variety of different failure mechanisms. On occasion, materials are loaded beyond a tensile strength of the material and the material fractures abruptly and completely. In these circumstances the material is usually irreparable and must be replaced. However, often materials do not fail in an abrupt complete manner, but rather fail due to fatigue or localized stresses which exceed design criteria, causing cracks to form in the material. Often when these cracks initially form, the material is still functional for its desired purpose. For instance, a reciprocating machine may receive cracks in its structural material and yet continue to operate, albeit at perhaps a lesser efficiency. Cracks thus serve as indicators that a material is being over stressed and yet also provides an opportunity for remedial measures to be taken without requiring entire replacement of the affected materials.

While crack repair methods have become well known in the art, they have traditionally been looked upon as primarily a temporary or stopgap measure which usually cannot be relied upon to permanently repair a crack-damaged material. Usually "repaired" cracks are still weaker than surrounding material and thus are subject to recracking or other failure in the same location. However, crack repair is attractive in that it can often extend the life of the material without requiring significant downtime for the machinery which utilizes the material. Thus, crack repair can result in the avoidance of significant replacement costs.

Accordingly, a need exists for a method and apparatus for crack repair which can be performed in a low-cost, timely manner and yet repair the crack to a level which makes the material as strong as (or stronger than) it was before the crack occurred.

Crack repair pins or "plugs" have been known in the art which are threaded into holes drilled in the cracks to prevent cracks from continuing to propagate. These "plugs" have also been somewhat effective in resealing materials such as cast iron casings which require that they maintain a somewhat pressurized environment without allowing fluids to escape therefrom.

In addition, locks are known in the art which can draw cracks together somewhat and extend the life a material which is cracked.

However, neither of these solutions can effectively strengthen the material to a level which makes it stronger than it was before the crack occurred and also effectively seal up the crack to establish a pressure-withstanding seam. The device of this invention, when used in accordance with the method of this invention, includes pins which have threads that angle upward toward the head of the pin. These upwardly angled threads engage with complementally formed threads in holes drilled into the crack. When the pins are advanced into the crack, the upwardly sloped threads draw opposite sides of the crack toward each other. Thus, the crack is actually drawn closed and sealed by the pins located within the crack.

Various devices are known in the art which include threads which extend upwardly. However, none of these threaded devices are configured to include all of the features of the pins of this invention. Furthermore, none of the threaded devices having upwardly sloping threads have been utilized in conjunction with a method for sealing cracks within a material.

SUMMARY OF THE INVENTION

In a preferred form, the pin of this invention includes a head with a means to apply torque thereto, a neck below the head, a shoulder below the neck and a threaded shaft below the shoulder. The head can include any of a variety of torque receiving configurations. For instance, the head can have multiple facets dimensioned to be addressed by facets of a wrench, slots formed complemental to slots of a screw driver, or other similar structure. The head thus receives torque and causes the pin to rotate about a central, long axis thereof.

The neck is interposed between the head and the shoulder and defines an area of the pin having a weakest tensile strength when experiencing torsional loads. Thus, when torque is applied through the head at greater and greater magnitudes, the pin fractures at the neck before fracturing in any other location.

The shoulder is interposed between the neck and the threaded shaft and defines a greater diameter portion. As the pin is threaded into a complementally formed hole, the shoulder abuts against an outer surface of the hole, identifying a point at which the pin can translate no further along the central, long axis.

The threaded shaft is a substantially cylindrical construct having a top adjacent the shoulder and a bottom defining a surface of the pin opposite the head. The threaded shaft has threads circumscribing an outer periphery thereof. The threads include a crest defining a major diameter thereof and a root defining a minor diameter thereof. An upper surface extends from a bottom edge of the root to an upper edge of the crest. A lower surface extends from a top edge of the root to a lower edge of the crest.

The upper surface extends upward linearly from the bottom edge of the root to the upper edge of the crest. Similarly, the lower edge extends linearly upward from the top edge of the root to the lower edge of the crest. Thus, the upper edge of the crest is closer to the head than the adjacent bottom edge of the root.

In mending a crack, holes are drilled such that a central axis of the hole extends between opposite sides of the crack. Each hole is configured such that the diameter and the threads thereof are substantially complemental to the threaded shaft of the pins. However, a major diameter of the hole is slightly greater than a major diameter of the pin. A pin is threaded into the hole by applying torque through the head until the shoulder abuts the surface of the material. At that point, the pin can no longer translate along the central axis and into the material.

Further torque is applied to the head causing the pin to rotate and causing the upper surface of the threads to slide along the complementally formed threads of the hole drawing opposite sides of the hole toward each other and hence opposite sides of the crack toward each other. The application of torque is continued until a maximum torsional force for the neck is reached causing the head to shear off at the neck.

Multiple threaded holes are located along the length of the crack and filled with pins to mend the crack. In addition, locks may first be placed transverse to the crack which fit within complementally formed lock receiving holes having a slightly greater length than the locks. Thus, when the locks are placed within the lock receiving holes, the crack is drawn closed somewhat.

OBJECTS OF THE INVENTION

Accordingly, it is a primary object of the present invention to provide a method for mending a crack in a material by drilling holes in the material and locating threaded pins therein with threads which angle upwards towards a surface of the material.

Another further object of the present invention is to provide a method for mending cracks which draws opposite sides of the crack closer together.

Another further object of the present invention is to provide a method for mending cracks that strengthens the cracked region to an equal or greater strength than surrounding regions.

Another further object of the present invention is to provide a method for mending cracks which totally removes the crack from the material.

Another further object of the present invention is to provide a method for mending cracks which can mend cracks existing in sharply angled casted materials.

Another further object of the present invention is to provide a crack mending pin that has threads which angle upwards toward a head of the pin.

Another further object of the present invention is to provide a mending pin which has a head which is driveable by a commonly available torque applying device.

Another further object of the present invention is to provide a mending pin which has threads which are slightly spaced from each other and maintain a minimum thickness between a root and a crest thereof, providing a durable thread.

Another further object of the present invention is to provide a mending pin designed to enter a complementally formed hole only a finite distance and then to have the opposing sides of the hole drawn toward each other.

Another further object of the present invention is to provide a mending pin which has a necked-down portion which snaps off before threads of the mending pin are damaged.

Another further object of the present invention is to provide a tap capable of tapping holes with threads that angle upwards towards a surface of the material in which the hole is drilled.

Another further object of the present invention is to provide a mending pin which is simple and inexpensive to manufacture and yet durable in construction.

Another further object of the present invention is to provide a tap which easily forms threads within a hole, the threads receiving a mending pin which has threads which angle upward toward a head of the pin.

Another further object of the present invention is to provide a method and apparatus for quickly mending cracks in cast machinery without disassembly of components of the machinery.

Another further object of the present invention is to provide a method and apparatus for mending cast metal machinery that can be performed at the site of the machinery with easily transportable tools.

Another further object of the present invention is to provide a mending pin which can draw together sides of a complementally formed hole drilled into a crack and hold the sides together after portions of the pin above a surface of the cracked material are ground away.

Viewed from a first vantage point it is an object of the present invention to provide a method for repairing a crack in a material having a surface by forcing opposite sides of the crack together, the steps including: drilling holes through the surface and between opposite sides of the crack, tapping the holes with threads, the threads having a major diameter and a minor diameter, with a top portion of each thread adjacent to the major diameter closer to the surface than any other portion thereof, and threading pins into the holes formed in said drilling step, the pins including a head and threads with a major diameter and a minor diameter with a top portion of each thread adjacent the major diameter closer to the head than any other part thereof; whereby when the pin is threaded into the holes, threads of the pins engage threads of the holes forcing opposite sides of the crack toward each other.

Viewed from a second vantage point it is an object of the present invention to provide a threaded pin for location into a threaded hole that straddles a crack in a material having a surface, the hole including a first curved wall on a first side of the crack and a second curved wall on a second side of the crack, the hole including threads therein with a major diameter and a minor diameter with a portion of each thread adjacent the major diameter closer to the surface than any other portion of the thread, said pin comprising, in combination: a head including a means to transfer torque to the pin, a threaded shaft extending from the head including threads thereon, each thread including a crest defining a major diameter of the threaded shaft and a root defining a minor diameter of the threaded shaft, an upper edge of the crest of each portion of the thread located closer to the thread than a bottom edge of the root above an adjacent portion of the thread, and a means for opposing long axis translation of the pin; whereby when the pin is threaded into the hole, further rotation of the pin forces the first side of the crack and the second side of the crack together.

Viewed from a third vantage point it is an object of the present invention to provide a tapping bit for forming threads in a hole in material, the threads having a major diameter and a minor diameter, each section of the threads being closer to a surface of the material at the major diameter and at adjacent minor diameter, said tapping bit comprising in combination:

a cylindrical body similar in diameter to the hole to be tapped, and teeth extending from this cylindrical body, each tooth having a contour including an upper side, a lower side, and a outer side and spaced vertically from adjacent teeth by an inner side, said inner side and said outer side spaced horizontally at a distance similar to a desired distance between its minor diameter and its major diameter, said upper side and said lower side both higher in elevation adjacent said outer side than adjacent said inner side, whereby the tapping bit carves threads into the hole which extend away from a minor diameter and toward the surface.

These and other objects will be made manifest when considering the following detailed specification when taken in conjunction with the appended drawing figures.

BRIEF DESCRIPTION OF THE DRAWING FIGURES

FIG. 5 is elevational view of a taping bit configured to form the threads shown in the hole of FIG. 4.

FIG. 6 is a detail of a portion of the teeth shown in FIG. 5.

FIG. 7 is bottom view of that which is shown in FIG. 5.

FIGS. 8A through 8D reveal steps in the crack repair method of this invention showing the sequence of pin application preferred for mending a crack in a material.

Figure 8A:
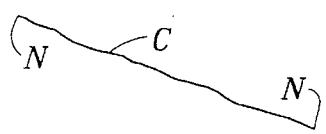
Figure 8B:
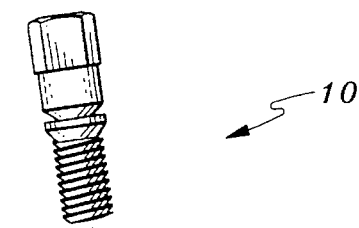
Figure 8C:
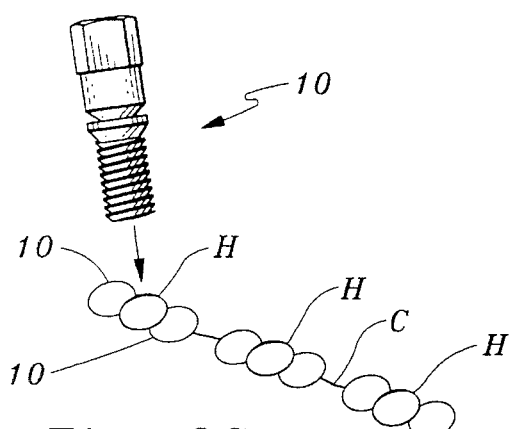
Figure 8D:
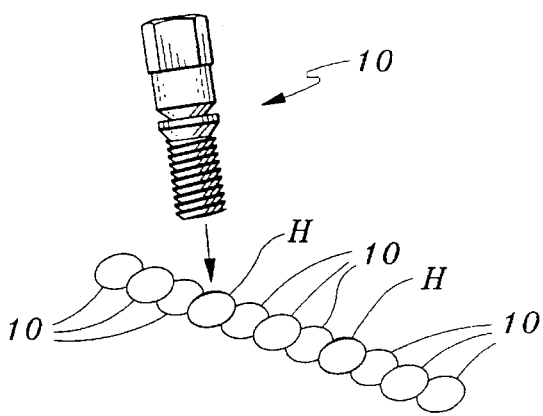
Figure 8E:
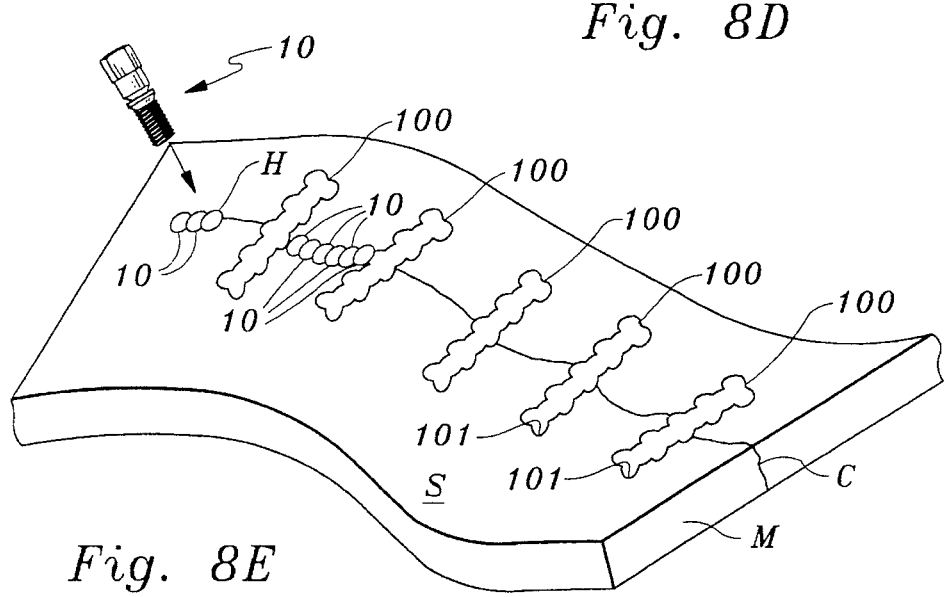

FIG. 8E reveals an alternative crack mending arrangement including locks.

Figure 9:
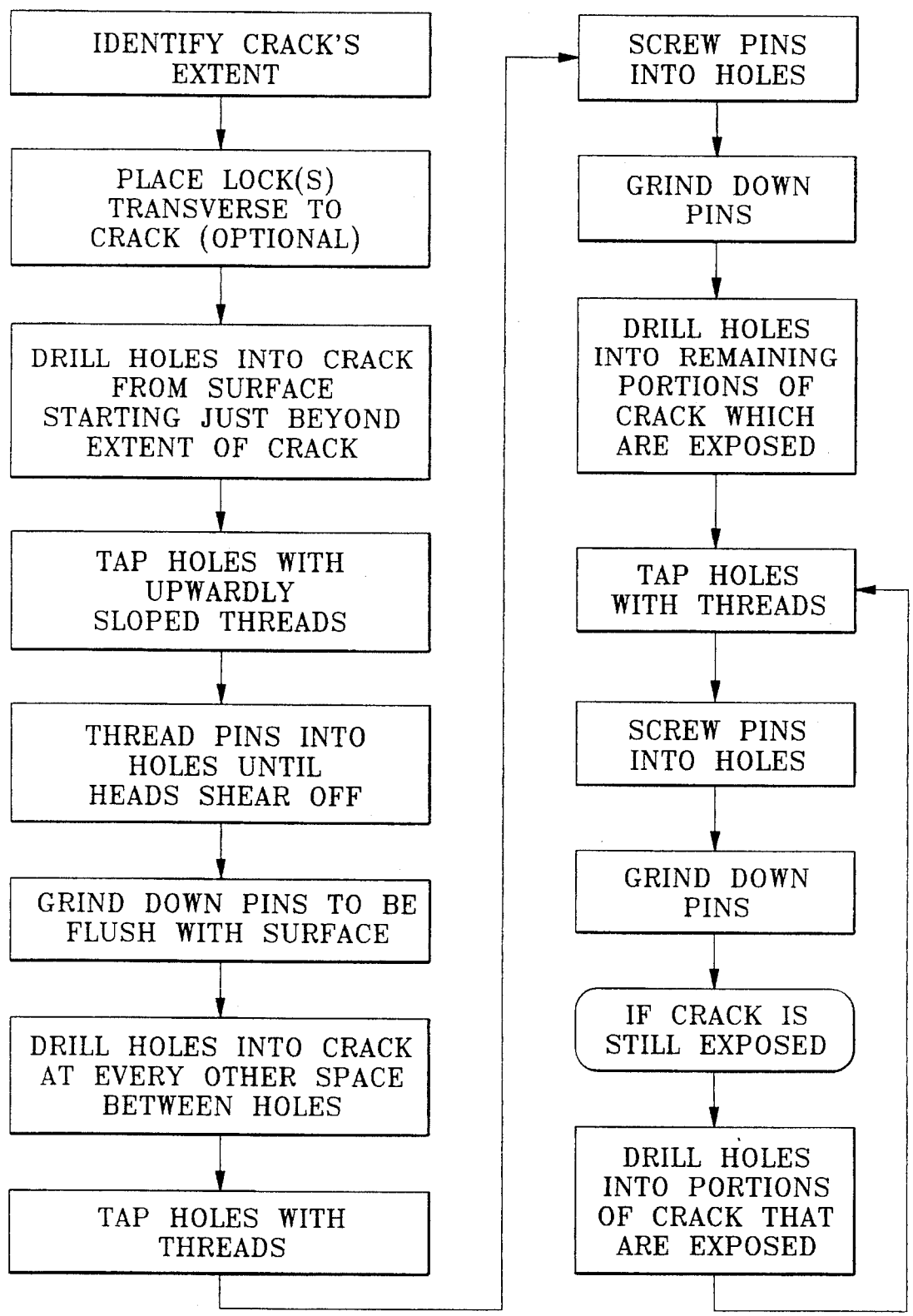

FIG. 9 is a flow chart revealing the steps involved in the method of crack repair of this invention.

Figure 2:
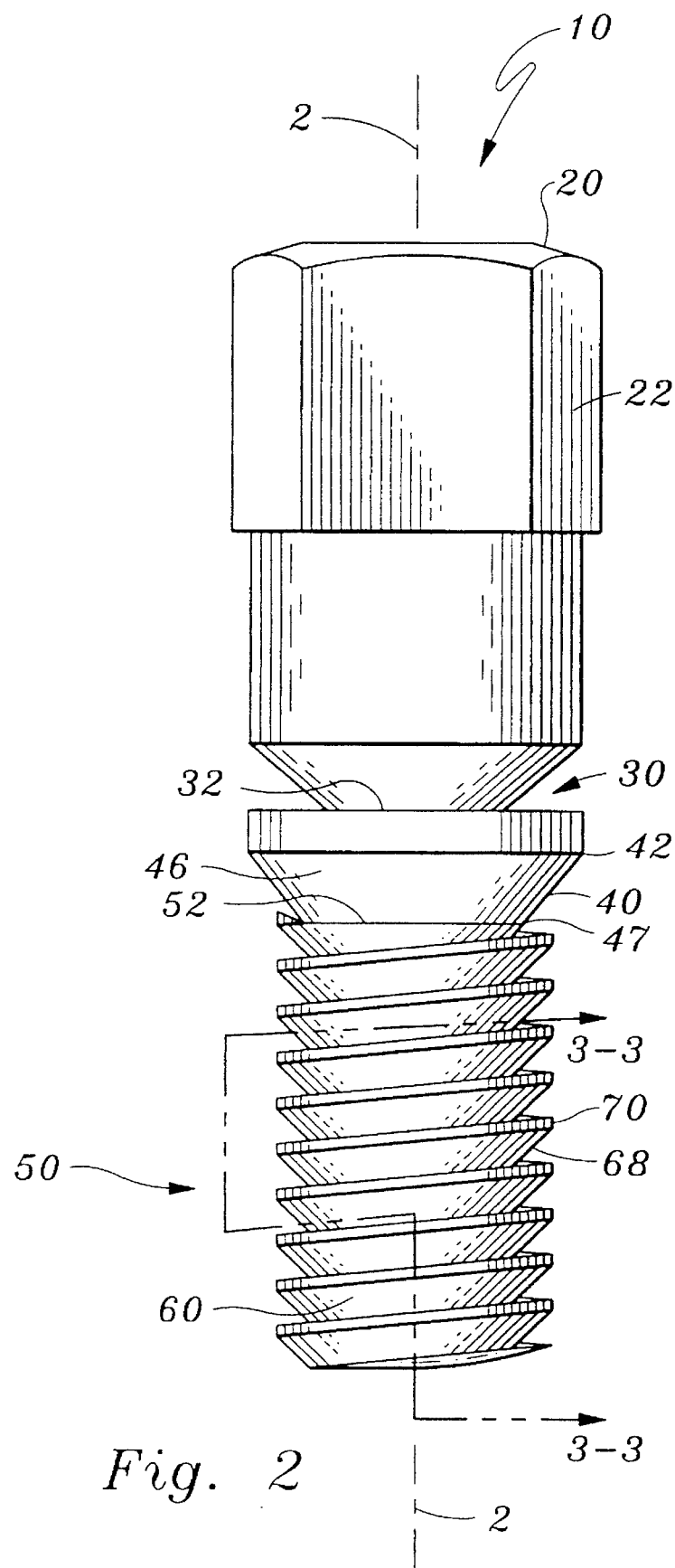
FIG. 2 is a elevational view of the pin of FIG. 1 before threading into the hole of FIG. 1.
Figure 3:
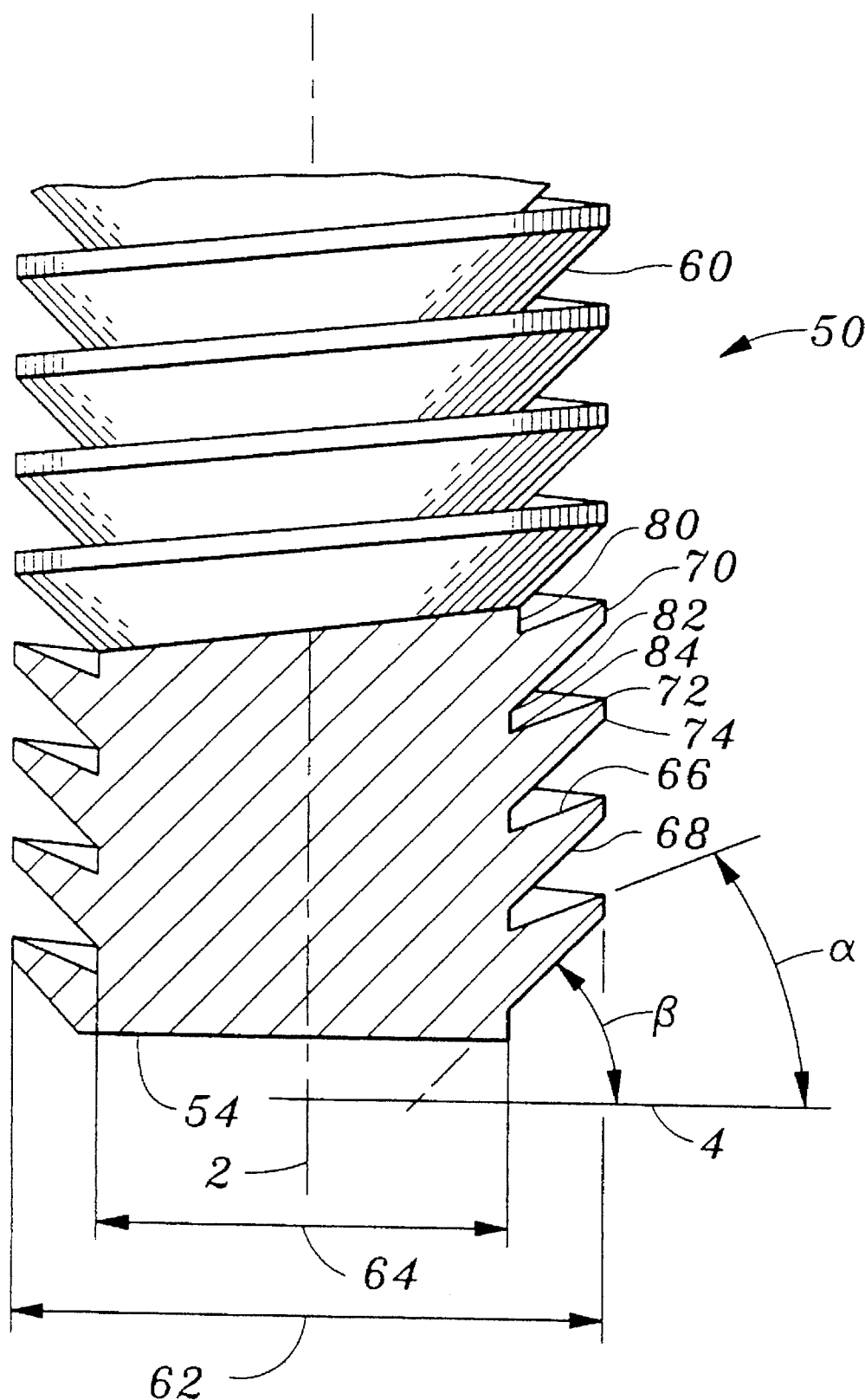
FIG. 3 is a partial section detail view of the pin of FIG. 2 taken along the line 3—3 of FIG. 2.
Figures 10, 11:
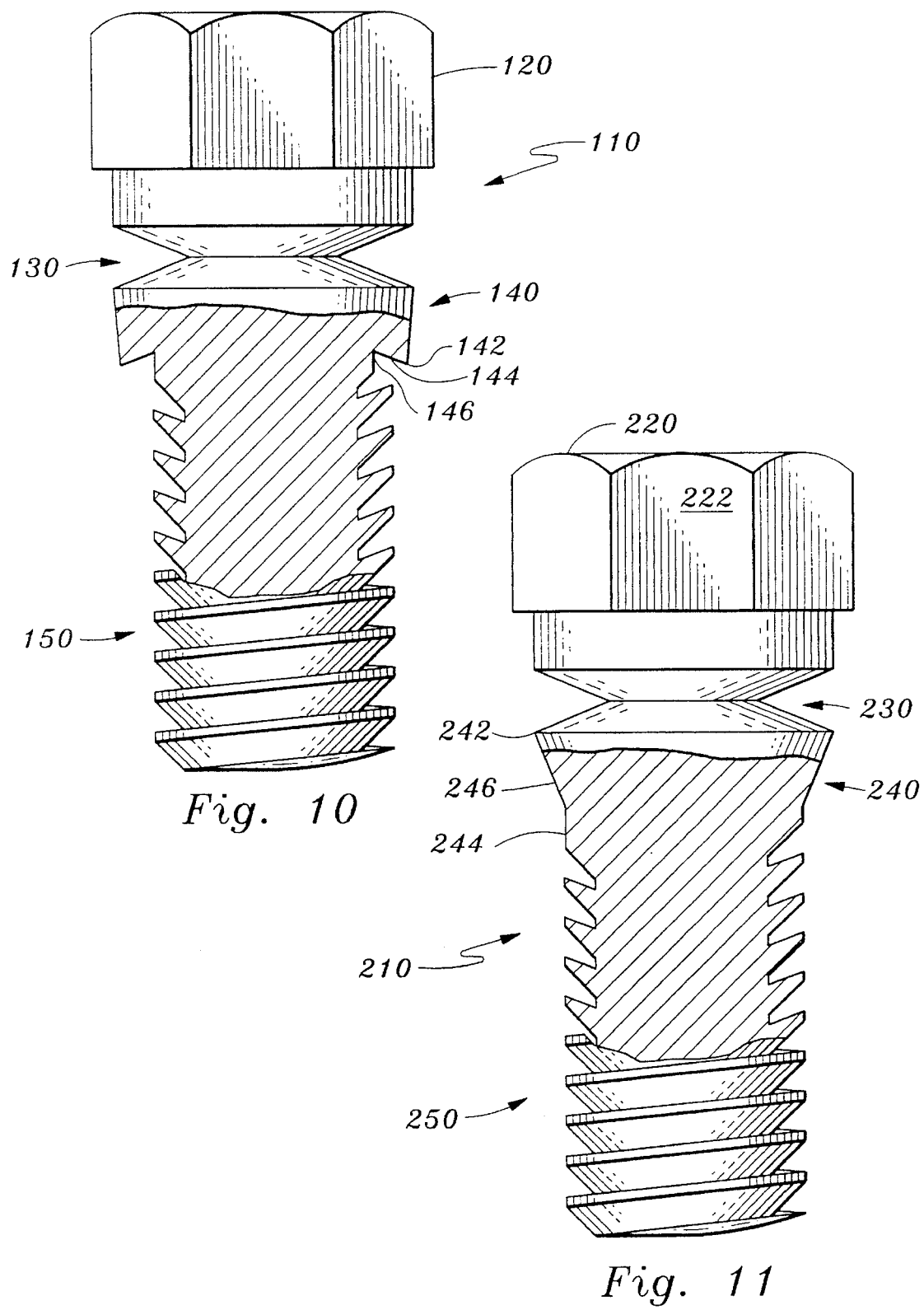

FIG. 10 is an elevational view of an alternative embodiment of that which is shown in FIG. 2 with some features shown in section and some hidden features revealed.

FIG. 11 is an elevational view of an alternative embodiment of that which is shown in FIG. 10 with some hidden features revealed.

Figure 12:
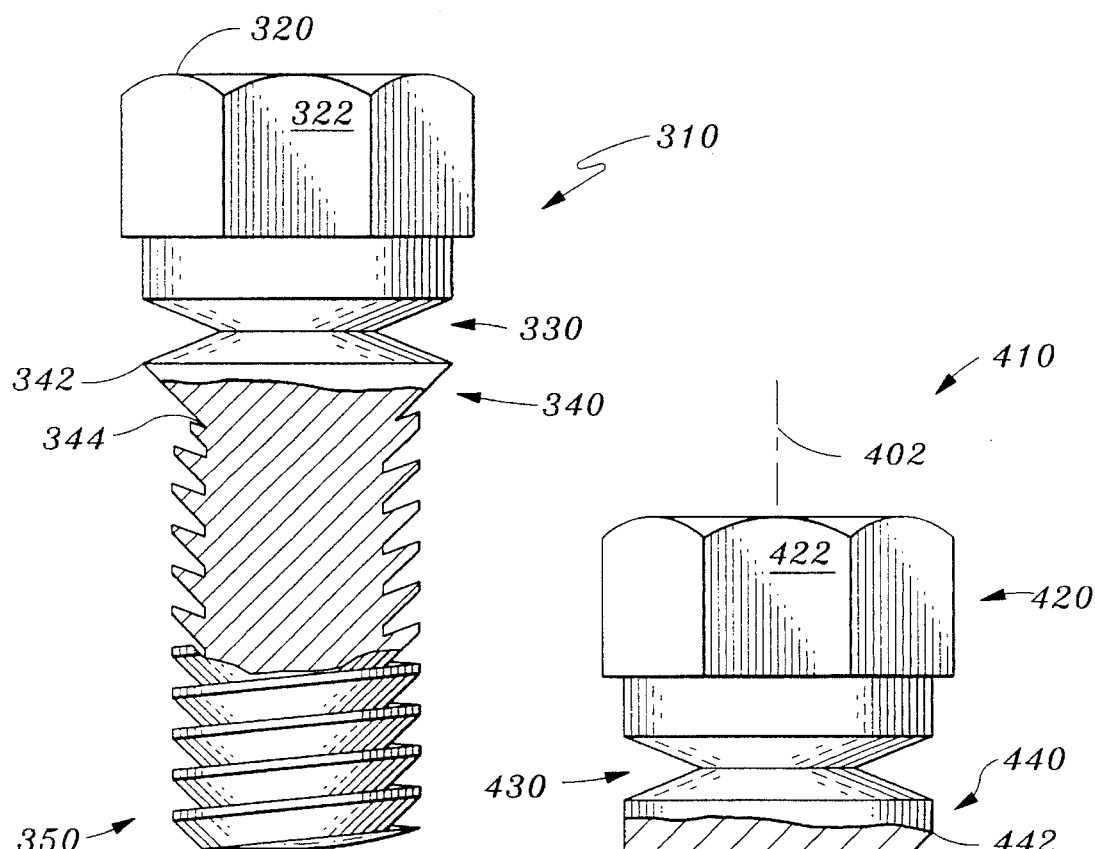

FIG. 12 is an elevational view of an alternative embodiment of that which is shown in FIG. 10 with some hidden features revealed.

Figure 4:
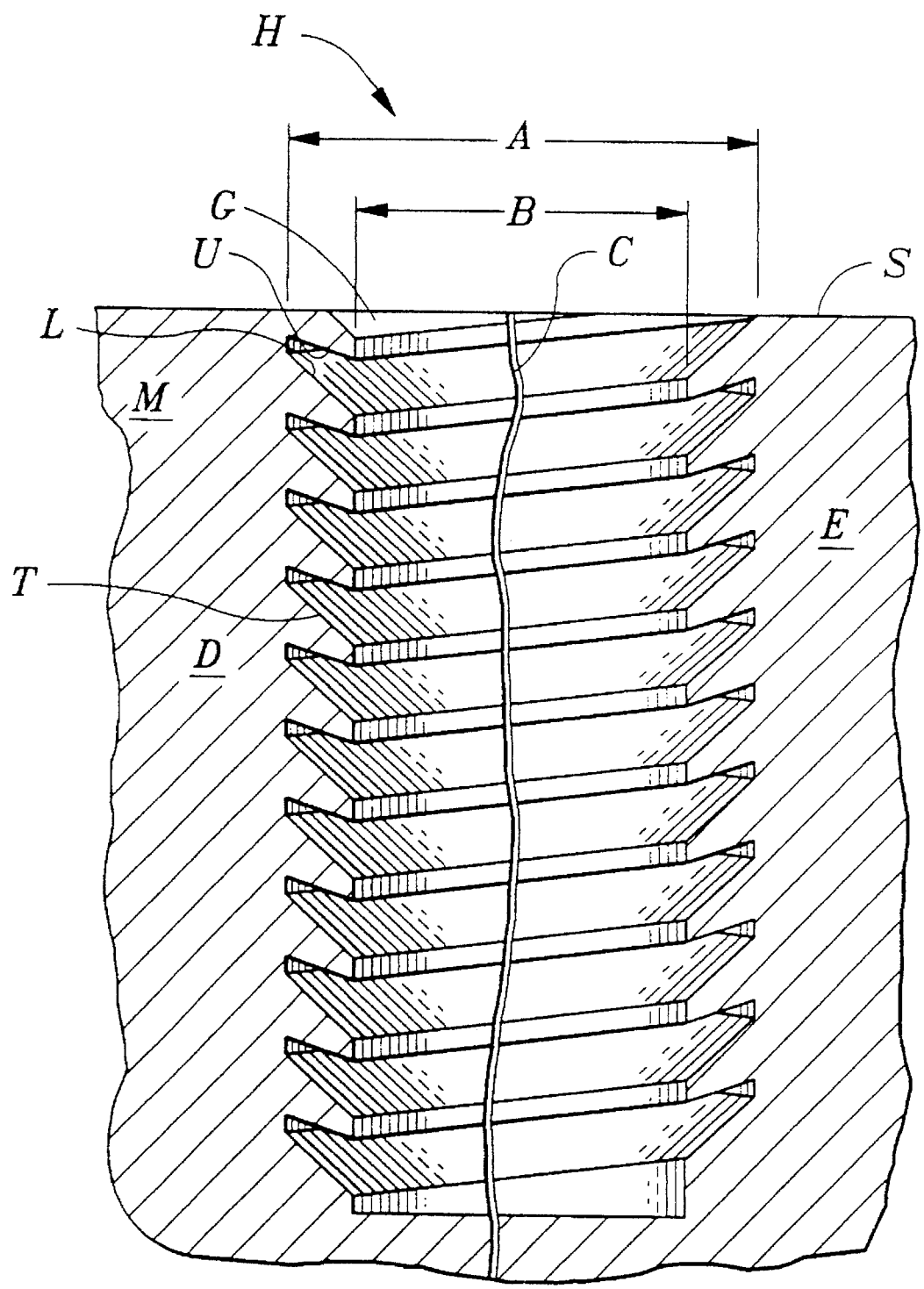
FIG. 4 is a sectional view of the hole shown in FIG. 1.
Figure 13:
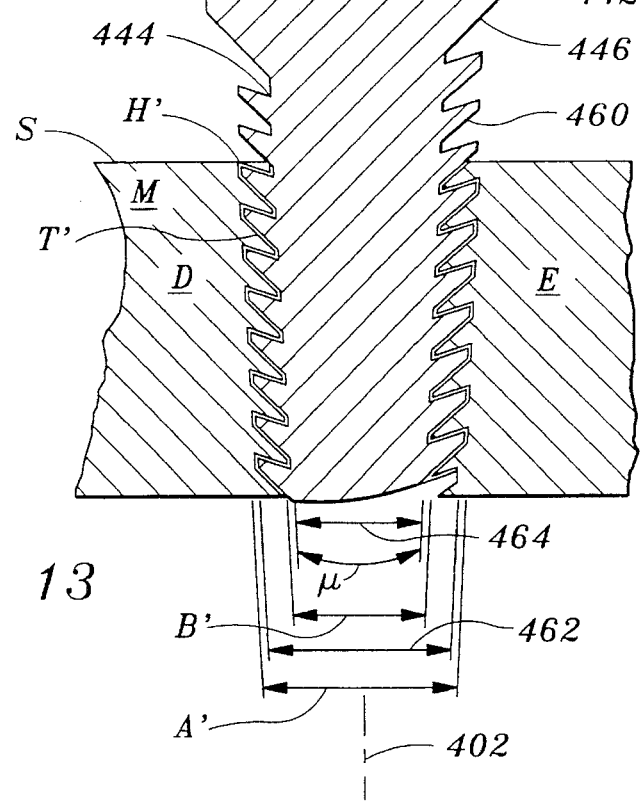

FIG. 13 is a sectional view of an alternative embodiment of that which is shown in FIG. 2 in place within a hole which is an alternative embodiment of the hole shown in FIG. 4.

FIG. 14 is a schematic view of the pin of FIG. 13 revealing how the pin of FIG. 14 would mend a crack in a corner of a material.

FIG. 15 is an elevational view of a series of pins, representing an alternative embodiment of this invention, within a hole shown in section.

Figure 16:
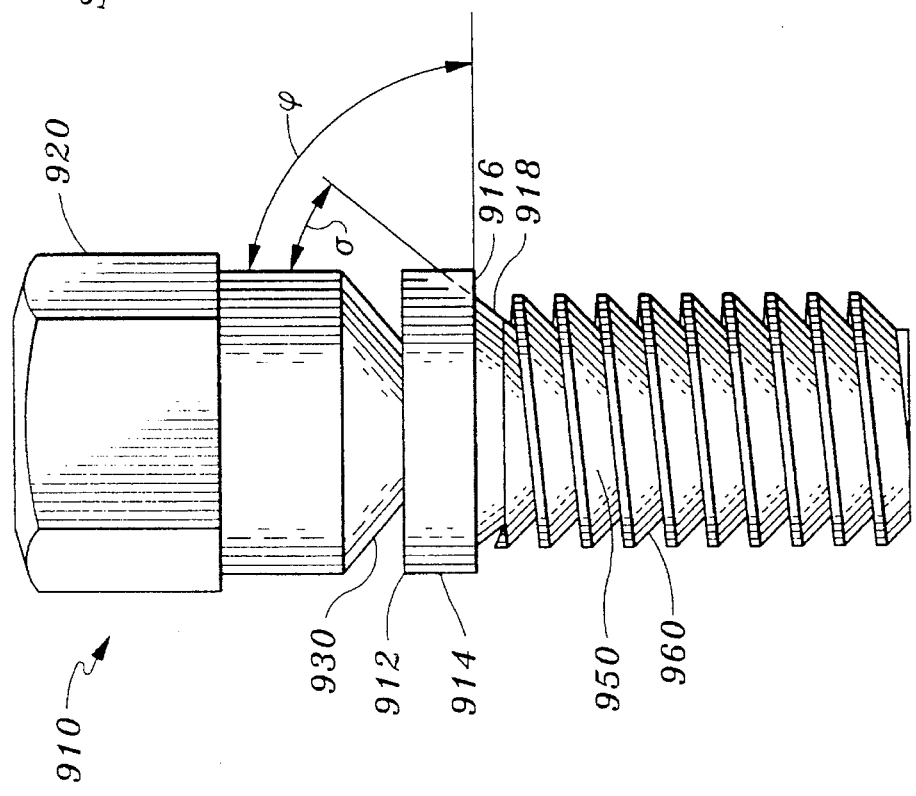

FIG. 16 is a front view of an alternative embodiment of the pin of this invention.

Figure 1:
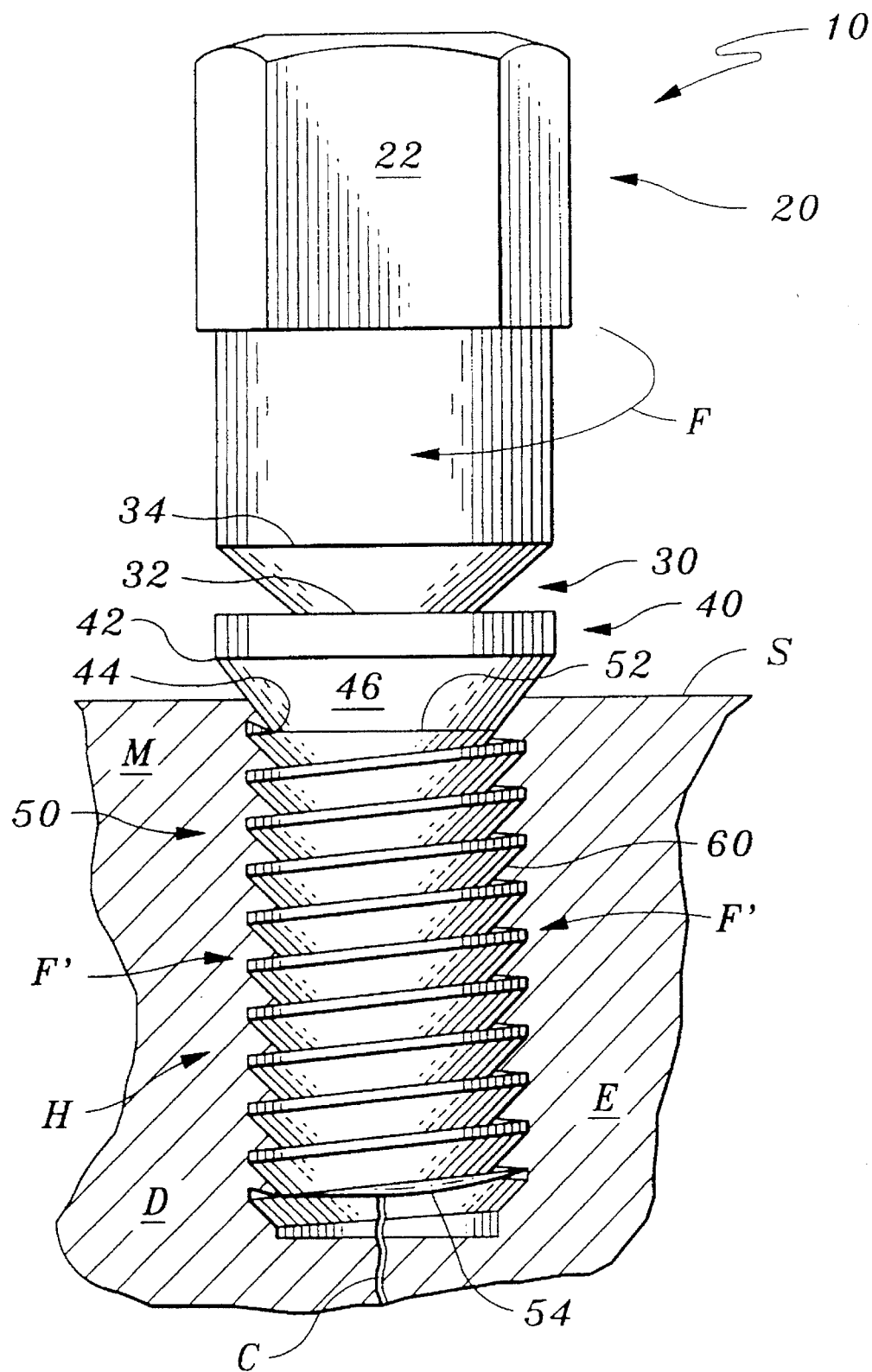
FIG. 1 is an elevational view of a pin of this invention screwed into a hole in the material being mended, the hole shown in section.
Figure 17:
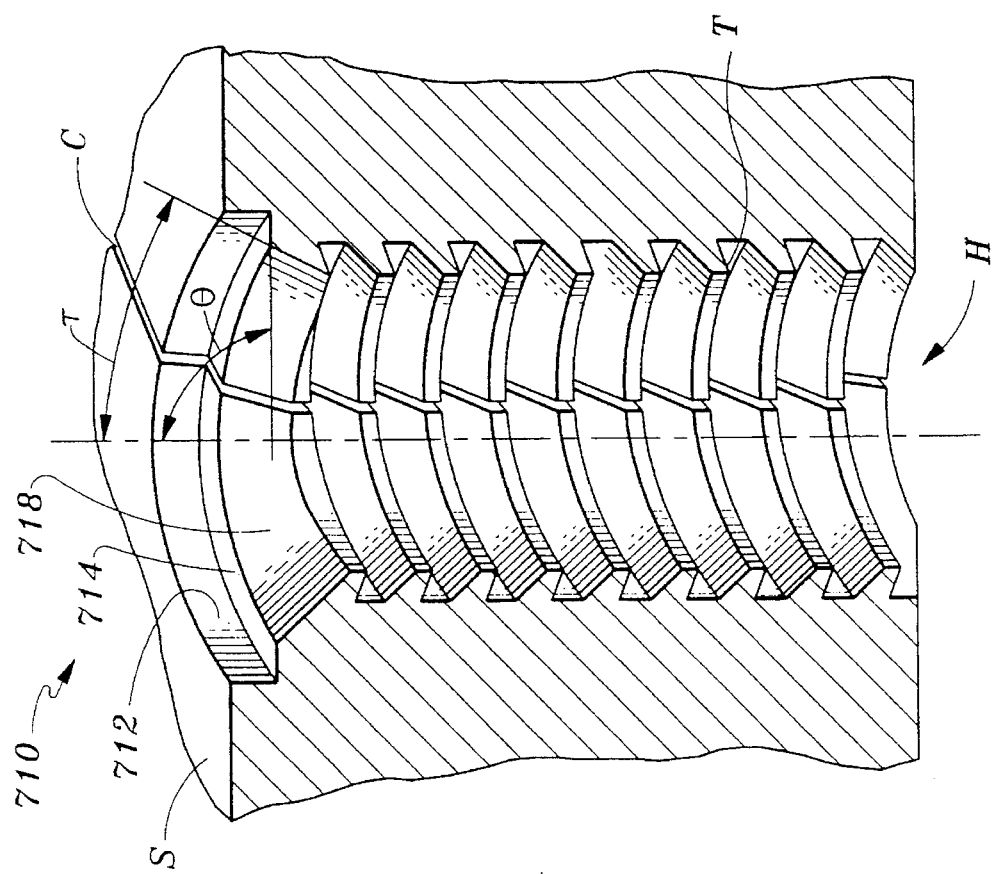

FIG. 17 is a sectional view of an alternative embodiment of the hole shown in FIG. 1.

Figure 18:
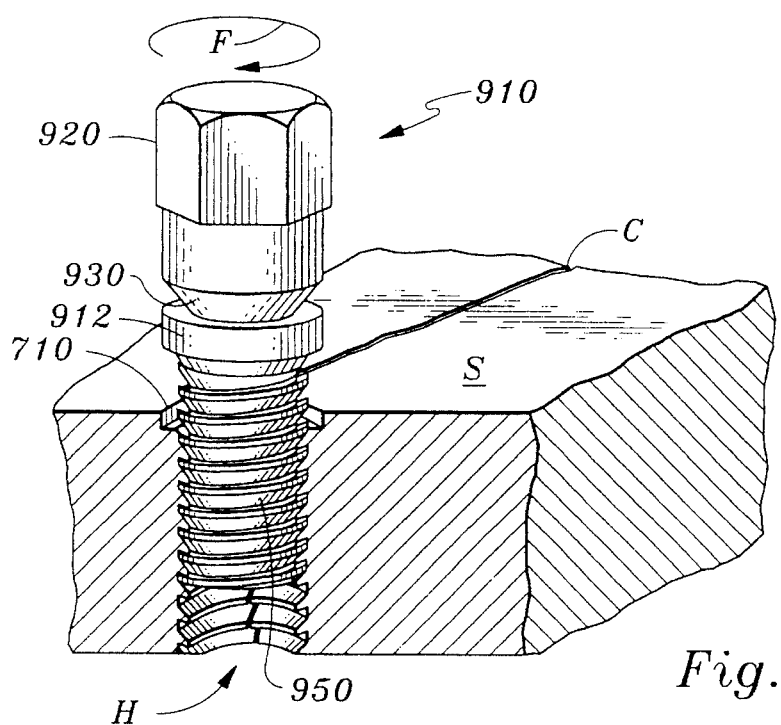

FIG. 18 is an isometric view of the pin of FIG. 16 entering the hole of FIG. 17.

Figure 19:
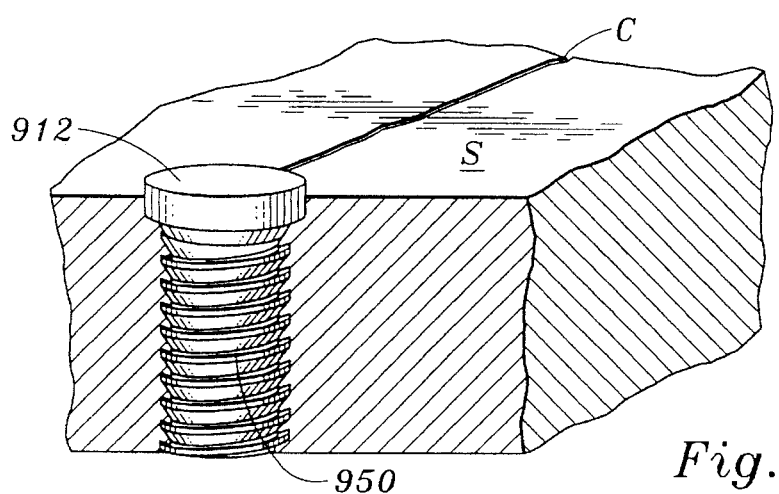

FIG. 19 is an isometric view of that which is shown in FIG. 18 with the pin seated within the hole.

Figure 20:
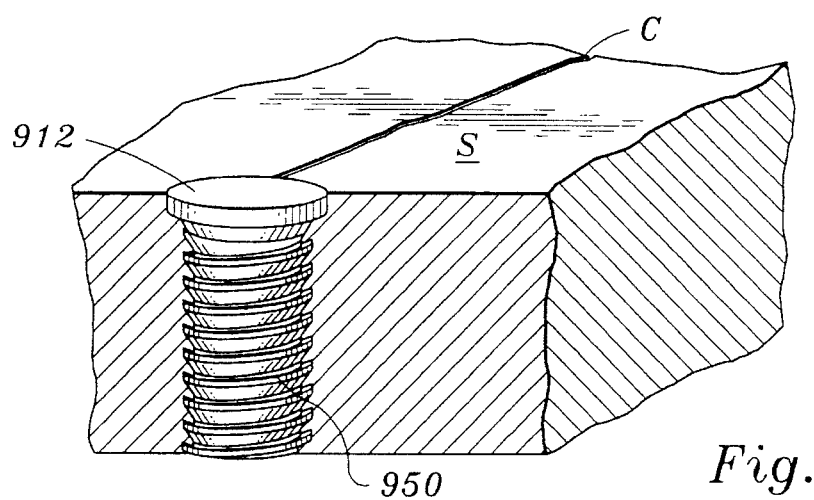

FIG. 20 is an isometric view of that which is shown in FIG. 19 with a portion of a head of the pin ground flush with the surface.

Figure 21:
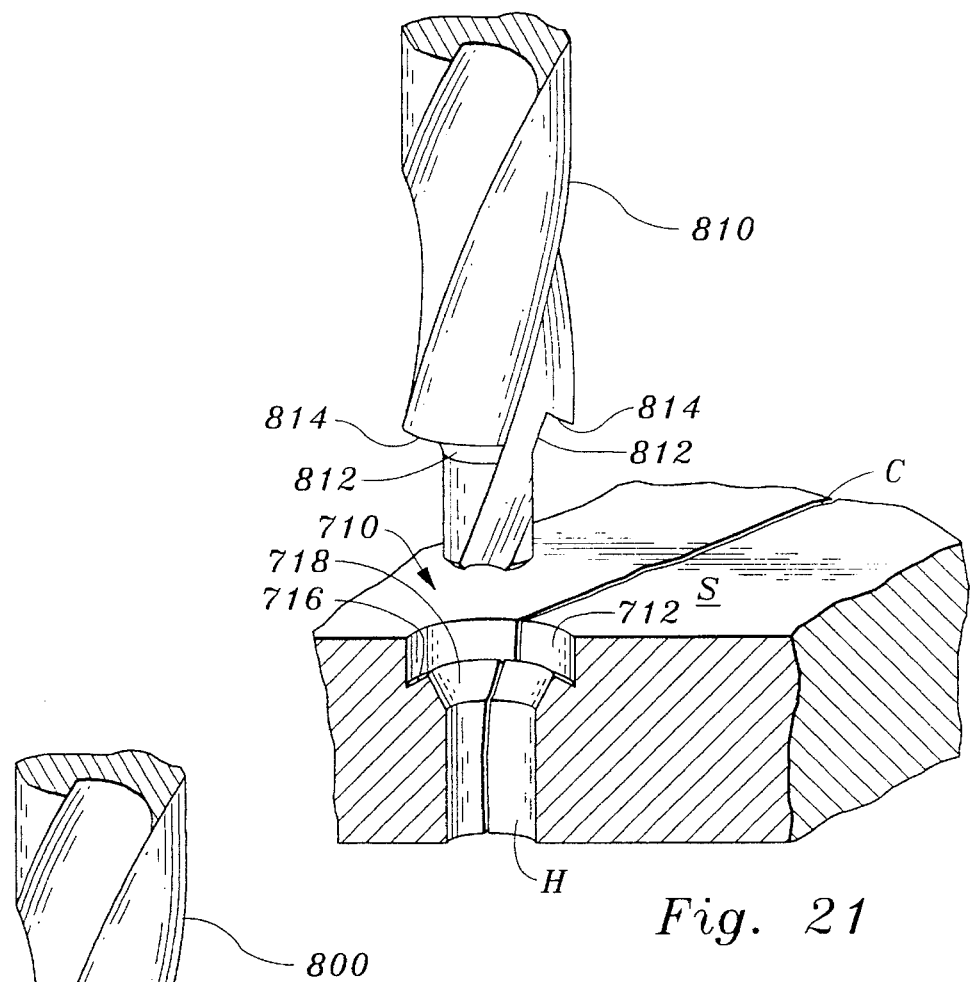

FIG. 21 is an isometric view of a bit utilized to form the hole of FIG. 17 with the hole shown in section.

Figure 22:
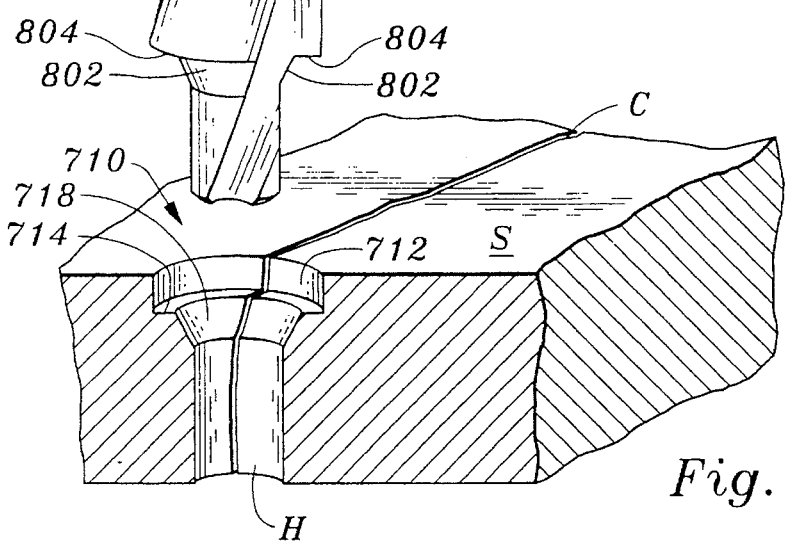

FIG. 22 is an alternative embodiment of the bit shown in FIG. 21

Figure 23:
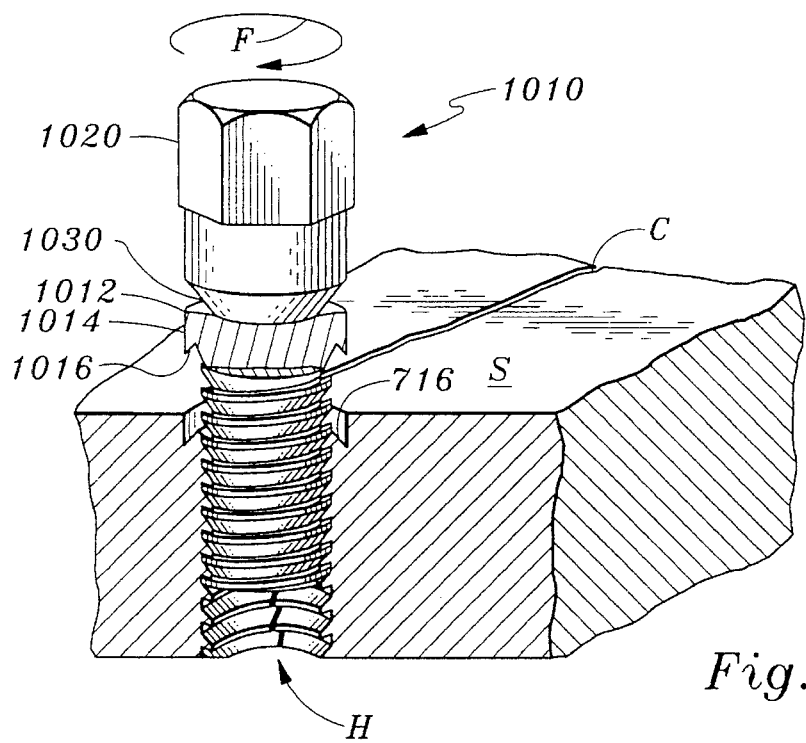
Figure 24:
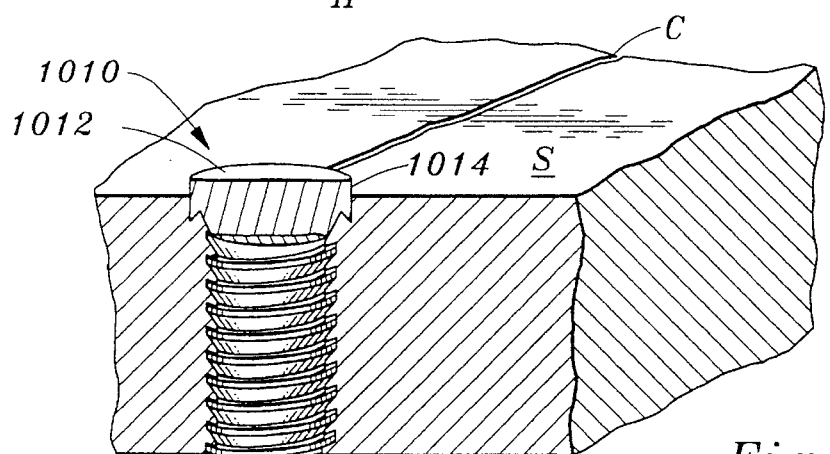
Figure 25:
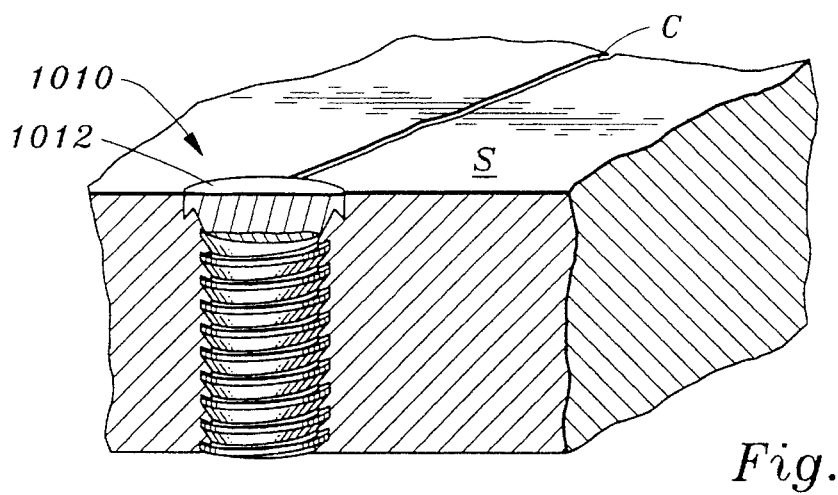

FIGS. 23 through 25 are perspective views revealing successive steps in utilizing an alternative cusped pin within a hole formed by the bit shown in FIG. 22.

Figure 26:
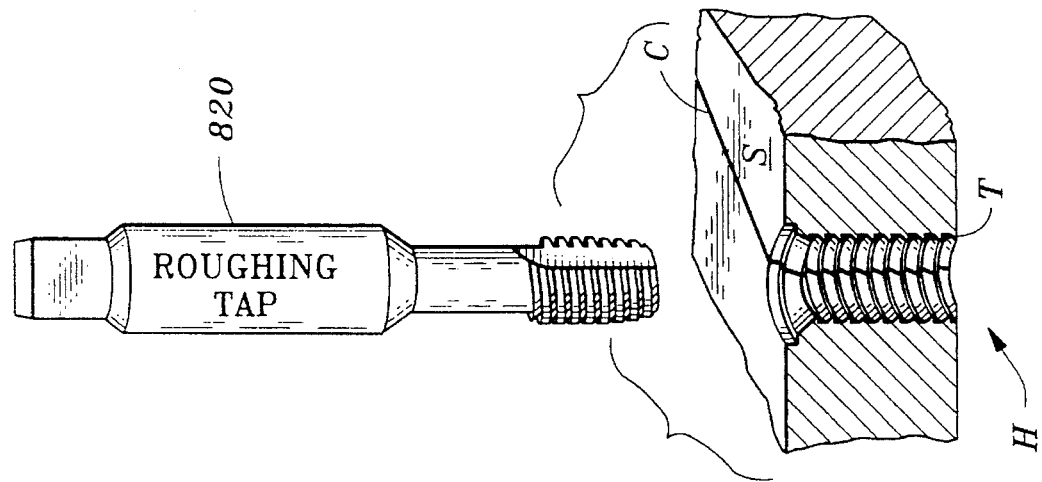

FIG. 26 is an isometric view of a roughing tap utilized in forming the hole of FIG. 17.

Figure 27:
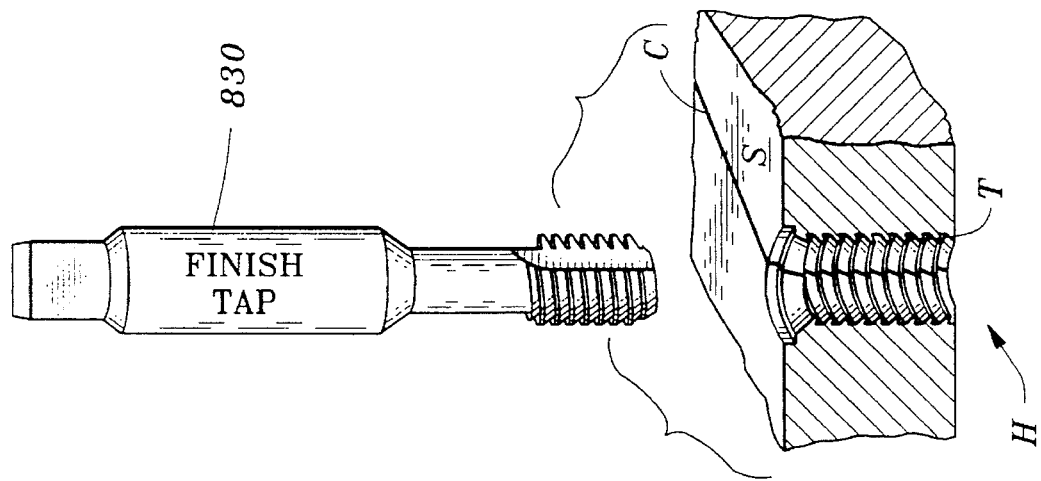

FIG. 27 is an isometric view of a finishing tap utilized after the roughing tap of FIG. 26 in forming threads within the hole of FIG. 17.

Figure 28:
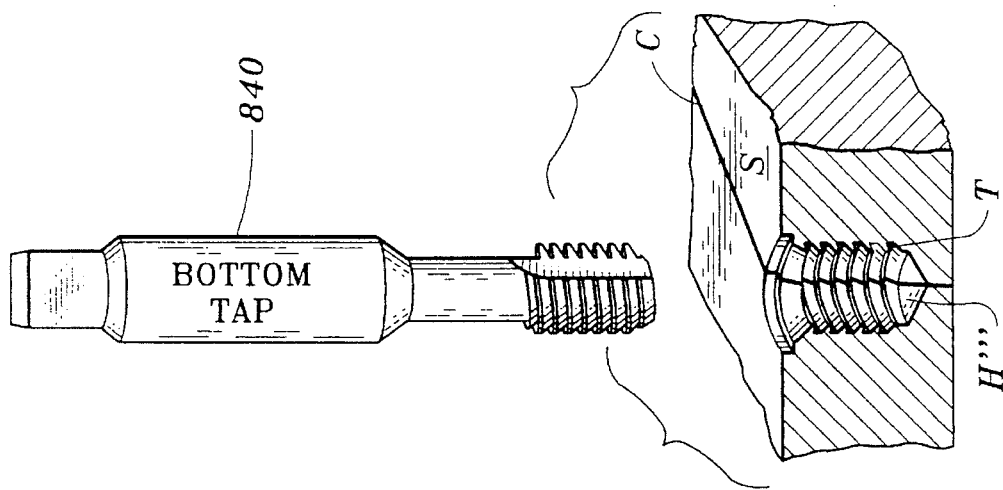

FIG. 28 is an isometric view of a bottoming tap utilized after the finishing tap of FIG. 27 in forming the threads within the hole of FIG. 17.

DETAILED DESCRIPTION OF PREFERRED EMBODIMENTS

Referring to the drawings wherein like reference numerals represent like parts throughout, reference numeral 10 (FIG. 1) is directed to a pin for repairing a crack C in a material M. The pin 10 is threaded into a hole H drilled into the crack C and utilizes upwardly directed threads 60 to draw opposite sides of the crack C toward each other, thus strengthening and sealing the material M surrounding the crack C.

In essence, and referring to FIGS. 1 through 4, the pin 10 includes a head 20 at an uppermost portion thereof, a neck 30 below the head 20, a shoulder 40 below the neck 30 and a threaded shaft 50 extending below the shoulder 40. The threaded shaft 50 includes threads 60 thereon which include an upper surface 66 and a lower surface 68 (FIG. 3) which extend upward toward the head 20 from a minor diameter 64 to a major diameter 62. Thus, a crest 70 of each thread 60 is closer to the head 20 than a portion of the thread 60 between adjacent roots 80 at the minor diameter 64.

The hole H (FIG. 4) is drilled into the material through a plane which is coincident with an exposed portion of the crack C. The hole H is threaded with threads T by a tapping bit 550 (FIGS. 5 through 7) which causes the threads T to be substantially complemental to the threads 60 of the pin 10. The threads T of the hole H thus are closer to a surface S of the material M at a major diameter A of the threads T than at a minor diameter B of the threads T.

The head 20 is coupleable to a torque applying instrument which can thread the pin 10 into the hole H. The shoulder 40 has a greater diameter portion 42 which has a diameter greater than a diameter of the threaded shaft 50. When the threaded shaft 50 has been screwed entirely into the hole H, the greater diameter 42 of the shoulder 40 abuts against the surface S of the material M. This abutment prevents the pin 10 from translating along a central long axis 2 any deeper into the hole H.

Upon further rotating of the pin 10, the upper surface 66 of the threads 60 engage the threads T of the hole H forcing a first curved wall G of the hole H on one first side D of the crack C toward a second curved wall I of the hole H on a second side E of the crack C. The first side D and the second side E of the crack C are thus drawn toward each other.

The neck 30 includes a necked down crease 32 which fractures, shearing the head 20 off of the pin 10 when a magnitude of torque applied to the pin 10 reaches a maximum torque to be applied to the threads 60. Thus, the neck 30 prevents the threads 60 from being overly stressed torsionally.

More specifically, and referring in detail to FIGS. 1 through 4, the pin 10 and associated hole H are shown in detail. The pin 10 includes the head 20 at an uppermost end thereof. The head 20 preferably includes multiple facets 22 arranged to allow a torque applying device to effectively engage the head 20. Preferably, the facets 22 are arranged in a hexagonal pattern to be engaged by a variety of commonly available torque applying tools. Alternatively, various other facet arrangements could be utilized or slots such as those receiving a screw driver or other tool could also be used. The head 20 is preferably radially symmetrical about a central axis 2 passing through the pin 10.

The neck 30 joins the head 20 to the shoulder 40. The neck 30 is preferably arranged as a single frustum with a greater diameter base 34 adjacent the head 20 and a lesser diameter crease 32 adjacent the shoulder 40. The crease 32 and base 34 thus define parallel planes of the frustum of the neck 30. The crease 32 is preferably designed to have a cross-sectional area which is less than a cross-sectional area of any other portion of the pin 10. Thus, when torsional loads increase, the pin 10 is most likely to fracture at the crease 32 than at any other location along the pin 10.

In addition, the crease 32 is preferably provided with a cross-sectional area which gives the crease 32 a maximum torsional load characteristic which is less than a torsional load necessary to cause damage to the threads 60 of the threaded shaft 50. In this way, if torsional loads on the pin 10 begin to approach a level which could cause damage to the threads 60 of the threaded shaft 50, the crease 32 of the neck 30 will fracture before a thread 60 damaging load is reached.

The shoulder 40 includes a greater diameter portion 42 directly adjacent the crease 32 of the neck 30. The greater diameter 42 of the shoulder 40 preferably has a greater diameter than a major diameter 62 of the threads 60. The greater diameter 42 also preferably has a greater diameter than a major diameter A of the hole H.

The greater diameter 42 transitions to a lesser diameter 44 of the shoulder 40 directly adjacent a top 52 of the threaded shaft 50. A frustum 46 is formed between the greater diameter 42 of the shoulder 40 and the lesser diameter 44 of the shoulder 40. This frustum 46 is somewhat irregular adjacent the lesser diameter 44 in that it transitions into the top 52 of the threaded shaft 50 where the helically wound threads 60 terminate. The shoulder 40 abuts against the surface S of the material M surrounding the hole H when the pin 10 is threaded into the hole H a sufficient distance along the central axis 2. The shoulder 40 prevents the pin 10 from translating into the hole H beyond a finite amount. The shoulder 40 thus causes the threads 60 of the pin 10 to draw the first side D and second side E of the crack C toward each other, rather than the thread 60 drawing the pin 10 further into the hole H along the central axis 2. The shoulder 40 thus acts to redirect forces applied between the pin 10 and the hole H.

The threaded shaft 50 is a substantially cylindrical construct which extends from the lesser diameter 44 of the shoulder 40 at a top 52 thereof to a bottom 54 which defines an opposite end of the pin 10 from the head 20. The threaded shaft 50 is oriented about the central axis 2 with the central axis 2 passing through a geometric center of the threaded shaft 50. The threaded shaft 50 has threads 60 formed about the cylindrical surface thereof.

The threads 60 are actually one continuous helically wound thread which begins at the bottom 54 and spirals up to the top 52. While this single thread design is preferred, other arrangements including compound series of threads which wind helically together from the bottom 54 to the top 52 could also be utilized.

The threads 60 include a crest 70 defining a major diameter 62 of the threads and a root 80 defining a minor diameter 64 of the threads 60. As shown in detail in FIG. 3, the threads 60 have an upper surface 66 which extends from a bottom edge 84 of the root 80 to the upper edge 72 of crest 70. The threads 60 also include a lower surface 68 which extends from a top edge 82 of the root 80 to a lower edge 74 of the crest 70. Both the upper surface 66 and lower surface 68 angle upwards toward the head 70 as the surfaces 66, 68 extend from the root 80 to the crest 70. Both the crest 70 and root 80 exhibit a constant distance from the central axis 2 between the upper edge 72 and lower edge 74 and between the top edge 82 and the bottom edge 84.

In section, the surfaces 66, 68 extend linearly from the root 80 to the crest 70. However, as this contour is rotated helically about the threaded shaft 50 along with the threads 60, the upper surface 66 and lower surface 68 take on a curved surface appearance. This appearance is similar to that which would be formed by a linear section of the surface of a cone with a tip of the cone oriented downward and the cone rotated and translated upward along a central axis thereof. The upper surface 66 and lower surface 68 thus have a curved surface in three dimensions similar to that of a cone, but a linear character when viewed in section.

The upper surface 66 extends from the root 80 to the crest 70 at an upper surface angle $\alpha$ diverging from a reference plane 4 orthogonal to the central axis 2. The upper surface angle $\alpha$ is preferably 20° but could be any angle between 0° and 90°. The lower surface 68 extends from the root 80 to the crest 70 at a lower surface angle $\beta$ with respect to the reference plane 4. The lower surface angle $\beta$ is preferably 40° but could vary between 0° and 90°.

The upper surface angle $\alpha$ is preferably less than the lower surface angle $\beta$ such that a thickness of the threads 60 at the crest 70 is less than a thickness of the threads 60 between adjacent roots 80. In this way, the threads 60 are provided with greater thickness, and hence greater strength adjacent the minor diameter 64 than at the major diameter 62 and are thus more capable of bearing the loads experienced within the hole H.

Referring now to FIG. 4, details of the hole H are shown. The hole H is preferably substantially complemental in form to the threaded shaft 50 of the pin 10. The hole H includes threads T which include a major diameter A and a minor diameter B. Each thread T includes a lower surface L and an upper surface U. The hole H includes a first curved wall G on the first side D of the crack C and a second curved wall I on the second side E of the crack C. The hole H is thus bisected by the crack C.

The hole H is preferably located so that the crack C divides the hole H into two substantially equal portions. Thus, the hole H is oriented to extend along a line which approximates the direction of orientation of the crack C with respect to the surface S. Preferably, the hole H extends to the crack C from the surface S down to a location where the crack C stops. However, the hole H can stop short of a full depth of the crack C (as shown in FIGS. 1 and 4) when pins 10 of sufficient length are not available or when a hole H of shorter depth is sufficient to receive a pin 10 that can effectively support all of the crack C.

The threads T of the hole H are shaped to have surfaces L,U which conform to the upper surface 66 and lower surface 68 of the threads 60 of the pin 10. However, a major diameter A of the hole H is preferably slightly greater than a major diameter 62 of the threads 60 and the minor diameter B of the threads T is preferably slightly greater than a minor diameter 64 of threads 60.

This slight disparity provides a tolerance between the pin 10 and hole H for ease of fitting of the pin 10 into the hole H. Furthermore, this provides a finite amount of travel between the first curved wall G and the second curved wall I of the hole H when the pin 10 is tightened into the hole H, causing the first side D and second side E of the crack C to be drawn toward each other. Thus, the major diameter A and minor diameter B of the hole H are initially greater than the major diameter 62 and minor diameter 64 of the threads 60. After tightening the pin 10 into the hole H, this difference between the hole H and the threaded shaft 60 is reduced or eliminated.

FIGS. 5 through 7 show details of the tapping bit 550 preferably used to form the hole H. The tapping bit 550 is preferably a substantially cylindrical construct having a torque input head 590 at one end thereof and a bottom 552 on an opposite end thereof. A stop 580 defines a transitional region between a lesser diameter 582 and a greater diameter 584 portion of the tapping bit 550. The stop 580 is located a distance from the bottom 552 equal to a desired depth of the hole H to be formed by the tapping bit 550. The lesser diameter 582 of the tapping bit 550, below the stop 580, is preferably substantially similar to a diameter of the hole H before threading thereof with the threads T.

A plurality of teeth 560 are oriented proximate to the bottom 552 which extend helically around the tapping bit 550 at an angle similar to an angle of the threads T within the hole H. The teeth 560 include an upper side 562, a lower side 564, an outer side 566 and an inner side 568. Each of the teeth 560 is interrupted by a cutout groove 575 which prevents the teeth 560 from forming one continuous tooth extending along the tapping bit 550. The cutout groove 575 allows filings cut out of the hole H by the tapping bit 550 to escape from the teeth 560 and allow the teeth 560 to cut the threads T into the hole H without obstruction.

The teeth 560 are shaped with an upper side 582, lower side 564, outer side 586, and inner side 568. These sides 562, 564, 566, 568 are dimensioned in a manner similar to the threads T of the hole H. As noted above, the threads 60 of the pin 10 are slightly smaller in major diameter 62 and minor diameter 64 than the threads T of the hole H and thus, the teeth 560 are slightly larger in dimension than surfaces 66, 68 of the pin 10.

The upper sides 562 of each of the teeth 560 are oriented at an angle from a reference plane 554 orthogonal to a long axis of the tapping bit 550 at upper side angle ρ. The lower side 564 is angled at a lower side angle δ with respect to the reference plane 554. The lower side angle δ and upper side angle ρ are preferably similar to the lower surface angle β and upper surface angle α respectively.

A portion of the teeth 560 directly adjacent to the bottom 552 are beveled at a bevel 570 having a bevel angle 7 of preferably 60. This bevel 570 allows the teeth 560 to cut the thread T into the hole H in progressively greater amounts as the tapping bit 550 initially enters the hole H. While the tapping bit 550 is preferably utilized to from the threads T within the hole H, other bits and other methods of forming threads may be utilized to form the threads T within the hole H.

In forming the threads T within the hole H, the tapping bit 550 is oriented overlying hole H and is coupled to an appropriate torque applying device, such as a drill. The bit 550 is then lowered into the hole H with the bottom 552 entering the hole H. As the tapping bit 550 is lowered into the hole H the threads T are cut into the first curved wall G and the second curved wall I of the hole H.

In use and operation and referring to FIGS. 8A through 8E and FIG. 9, the pin 10 is preferably utilized in conjunction with other similar pins 10 in the following manner to mend a crack C within a material M. Initially, a user identifies the location and extent of the crack C. The crack C includes ends N defining an extent of the crack C along the surface S. Once the crack C has been fully identified, locks 100 may be optionally placed transverse to the crack C such as those disclosed in detail in U.S. Pat. No. 4,662,806 (see FIG. 8E). These locks 100 act to draw opposite sides of the crack C toward each other and to prevent the crack C from widening during the mending process. Each lock 100 is driven into a complementally formed, but slightly longer, lock receiving hole 101.

Holes H are then drilled into the crack C along the length of the crack. The holes H preferably extend slightly beyond a visible extent of the crack C at each end of the crack C. This ensures that the entire crack C is included in the mending process. The holes H are spaced a distance apart slightly less than a diameter of each hole H.

The holes H are then tapped with threads T so that they take on an appearance such as that shown in FIG. 4. Once all of the holes H have been threaded, the pins 10 are threaded into the holes H. Preferably, the pins 10 are threaded into the holes H until the heads 20 thereof shear off at the neck 30. This ensures that the pins 10 have been fully tightened into the holes H. An appropriate grinding tool is then used to grind down the remainder of each pin 10 to be flush with the surface S.

While the crack mending procedure could be complete at this point, preferably holes are drilled into the crack C in between where pins 10 have already been placed (note that this can require that portions of pins 10 may need to be drilled out). Rather than drill holes H into every space between the pins 10 that have already been located into the crack C, holes H are drilled at every other gap between already located pins 10. Once these holes H are fitted with pins 10, remaining gaps between filled holes H are drilled to make holes H with pins 10 that are threaded thereinto.

Drilling of the holes H thus occurs in three stages. A first stage drills holes H at each end N of the crack C and every other hole H location that will eventually be drilled. A second stage drills holes H at any other gap along the crack C between adjacent holes H of the first stage. A third stage drills holes H at every remaining gap along the crack C between adjacent holes H.

Once the final portions of the crack C have been provided with holes H, all of the crack C visible upon the surface S will have been drilled out and incorporated into a portion of a hole H and threaded with a pin 10. However, at no time during the mending process will two holes H have been formed and not filled with pins 10 that are adjacent to each other and overlap each other.

In this way, each pin 10 fitted within the holes H is maintained with at least three-quarters of a circumference thereof in active engagement with the material M, insuring that the threads 60 of the pins 10 will not separate from the threads T of the hole H within the material M. The pins 10 are then ground down to be flush with the surface S leaving a surface S with no visible cracks C and only revealing a region where a series of pins 10 and, optionally locks 100 have been imbedded into the material M.

Referring again to FIG. 1, details of the exact mechanism of crack C closure are described. As the pin 10 is threaded into the hole H, rotation of the pin 10 causes a force F to be exerted between the threads 60 and the threads T of the hole H. This rotational force F is counteracted through the threads 60, T, causing the pin 10 to migrate downward into the hole H. When the pin 10 has entered the hole H a sufficient distance to cause the shoulder 40 to abut the surface S surrounding the hole H, this vertical downward response of the pin 10 to the rotational force F is halted.

However, continued force F applied rotationally to the pin 10 continues to cause the upper surface 66 of the threads 60 to engage the upper surface U of the threads T of the hole H. This continued force F, rather than drawing the pin 10 downward vertically along the central axis 2, exerts a force F against the material M on each side of the hole H tending to draw the first curved wall G and the second curved wall I toward each other. This closing force F causes the first side D and second side E of the crack C to be drawn toward each other. In this way, the pins 10 and also the pins 110, 210, 310, 410, 910, 1010 draw the first side D and second side E of the crack C toward each other, thus mending the crack C.

Referring now to FIG. 10, an alternative embodiment of the pin 10 is shown. Pin 110 is similar in form to the pin 10 except that the shoulder 140 of the pin 110 does not include a frustum 46 (see FIG. 2) but rather includes a cusp 144. The cusp 144 is formed by a greater diameter portion 142 and a lesser diameter portion 146, with the lesser diameter portion 146 adjacent the threaded shaft 150 yet closer to the head 120 than the greater diameter portion 142. This pin 110, when screwed into the hole H has the cusp 144 address the surface S surrounding the hole H and preferably impregnates the surface S somewhat. Thus, the shoulder 140 fits tightly into the surface S surrounding the hole H before the head 120 snaps off at the neck 130.

Referring now to FIG. 11, an alternative embodiment of the pin 10 is shown. This pin 210 includes a head 220 with facets 222 thereon above a neck 230 which extends to a shoulder 240 which in turn is connected to a threaded shaft 250. The pin 210 differs from the pin 10 in that the shoulder 240 has a greater diameter 242 and a lesser diameter 244 which bound opposite sides of a frustum 246 which diverges very gradually between the lesser diameter 244 and the greater diameter 242.

FIG. 12 reveals an alternative embodiment of the pin 10. The pin 310 differs from the pin 10 of the preferred embodiment in that the shoulder 340 diverges more quickly between a lesser diameter 344 and a greater diameter 342. A head 320 with facets 322, neck 330 and threaded shaft 350 are substantially similar to the pin 10.

FIG. 13 reveals an alternative embodiment of the pin 10. Pin 410 includes a head 420 with facets 422 similar to that exhibited by the pin 10. A neck 430 of the pin 410 is also similar to the neck 30 of the pin 10. A shoulder 440 of the pin 410 is optional, but shown in FIG. 13 in a form similar to a shoulder 340 exhibited by the pin 310. However, the threaded shaft 450 of the pin 410 is distinct from the threaded shaft 50 of the pin 10 in that the minor diameter 464 of the pin 410 is not constant, but rather decreases as it moves away from the head 420.

The minor diameter 464 thus diverges at an angle μ divergent from a parallel orientation as is exhibited by the pin 10. This diverging minor diameter 464 is mirrored by the major diameter 462 of the pin 410. In use and operation, the pin 410 is screwed into a hole H' having a complementally formed diverging major diameter A' and minor diameter B' within threads T'. Eventually the pin 410 reaches a point at which threads 460 abut against the threads T' in the hole H'.

This abutment prevents the pin 410 from further translation downward along central axis 402. Thus, further rotation of the pin 410 causes the first side D and second side E of the crack C, upon which the hole H is located, to be drawn together. The neck 430 snaps the head 420 off when a sufficient torque is applied to the head 420, through the facets 422, to ensure that the threads 460 have effectively engage the threads T' of the hole H'.

FIG. 14 reveals a cornered portion of the material M with a crack C therein. FIG. 14 schematically represents a possible orientation of the pin 410 which would draw a first side D and second side E of the crack C toward each other, thus repairing the crack C. This utilization of the pin 410 allows opposite sides of the crack C to be drawn together when no convenient flat surface S is provided for abutment with the shoulder 440.

Referring now to FIG. 15, an alternative embodiment of pin 10 is shown. The pin 610 is particularly designed for use in holes H" that are especially long, because a long crack C has formed in a thick material M. The pin 610 is similar to the pin 10 except that the pin 610 does not have a head, neck, or shoulder. Instead, the pin 610 has a top 652 with a torque tool receiver 620 therein. The pin 610 is screwed into the hole H" with the threads 660 engaging the threads T until the bottom 654 abuts against a bottom wall J of the hole H". This abutment prevents further translation of the pin 610 into the hole H". Further rotation of the pin 610 causes the threads 660 to draw the threads T and associated crack sides D, E toward each other.

A second pin 610 can then be screwed into the hole H" directly over the first pin 610. The second pin 610 will continue into the hole H" until its bottom 654 abuts with the top 652 of the first pin 610. This abutment allows the second pin 610 to draw sides D, E of the crack C together. In this way, long cracks C can be securely mended.

Referring now to FIG. 16, an alternative embodiment of the pin 10 is shown. The pin 910 includes a head 920 and neck 930 similar to the head 20 and the neck 30 of the pin 10 (FIG. 1). The pin 910 also includes a threaded shaft 950 with threads 960 similar to the threaded shaft 50 and threads 60 of the pin 10. The pin 910 differs from the pin 10 in that a shoulder 912 is provided differing from the shoulder 40 of the pin 10. The shoulder 912 preferably includes a side wall 914 of substantially cylindrical construction and a bottom wall 916 which is preferably substantially perpendicular to the side wall 914 and to a long axis of the pin 910.

An angle φ between the bottom wall 916 and the side wall 914 is preferably 90°. However, the angle φ can be increased so that the bottom wall 916 exhibits a cusp-like appearance similar to that shown in FIG. 10. The bottom wall 916 can abut against the surface S, but preferably abuts against a floor 714 (FIG. 17) within a counterbore 710 surrounding the hole H adjacent the surface S.

The shoulder 912 connects to the threaded shaft 950 through a frustum 918. The frustum 918 provides clearance between the shoulder 912 and an uppermost end of the threaded shaft 950, which allows the threads 960 to be formed with the upwardly sloping surfaces characterized in detail hereinabove with respect to the pin 10. The frustum 918 preferably has an exterior surface which angles at a slope σ of preferably 30° away from the sidewall 914 of the shoulder 912.

FIG. 17 reveals a modified form of the hole H which particularly facilitates secure attachment of the pin 910 therein and secure binding of opposite sides of the crack C. Particularly, the hole H includes a counterbore 710 formed at a transition between the hole H and the surface S. The counterbore 710 preferably includes a cylindrical side surface 712 dimensioned similarly to the side wall 914 of the pin 910. The side surface 912 extends from the surface S down to the floor 714. The floor 714 is preferably angled at an angle θ of approximately 90° away from a central axis of the hole H.

Alternatively, the angle θ can be greater than 90° and conform to any angle exhibited by the angle φ of the bottom wall 916 of the pin 910. Examples of this angle θ greater than 90° are exhibited in the shoulder 140 of the pin 110 (FIG. 10) and the bottom wall 1016 of the pin 1010 (FIGS. 23 through 25) discussed further hereinbelow. The floor 714 extends from a lower edge of the side surface 912 into a thread relief 718 which extends down from the floor 714 to the threads T along a slope τ preferably of approximately 30° from the central axis of the hole H.

The counterbore 710 allows the shoulder 912 to rest below the surface S partially so that when portions of the shoulder 912 are ground away to a level coplanar with the surface S, a portion of the shoulder 912 remains and allows the pin 910 to continue to maintain an opposing force between the shoulder 912 and the threads 960 equally on opposite sides of the crack C at floor 714 to hold opposite sides of the crack C together. When the surface S is sloped or curved, the counterbore 710 provides a surface against which the shoulder 912 can still securely contact. Also, when a material is severely cracked so that the opposite sides of the crack C are not held together, the counterbore 710 prevents one side of the crack C from being elevated upwards which would allow the threads T, 960 to disengage and the joint to separate.

When the crack C passes through the material at an angle non-perpendicular to the surface S, the hole H may be formed within the plane of the crack and nonperpendicular to the surface S with the floor 714 of the counterbore 710 perpendicular to the hole H and non-parallel with the surface S. In this way, the shoulder 912 of the pin 910 can still securely rest within the counterbore 710 without having the shoulder 912 abut one side of the crack C before the opposite side of crack C. The shoulder 912 of the pin 910 is preferably of sufficient height that a top portion of the shoulder 912 can be ground away to a plane parallel to the surface S while still providing sufficient material within the shoulder 912 to resist deflection of the shoulder 912 when the pin 910 is secured within the hole H.

Referring now to FIGS. 18 through 20, details of the utilization of the pin 910 are shown. After the threaded hole H is formed passing within a plane substantially coplanar with the crack C and the counterbore 710 has been formed, the pin 910 is located within the hole H by rotation about arrow F (FIG. 18). Rotation continues about arrow F until the shoulder 912 abuts against the floor 714 (FIG. 17) of the counterbore 710. As additional rotational forces are applied about arrow F, opposite sides of the crack C are drawn together as discussed hereinabove with respect to utilization of pin 10. Once sufficient torque is applied that the neck 930 can no longer resist deformation, the head 920 is severed therefrom as shown in FIG. 19. Finally, a portion of the shoulder 612 above the surface S is ground until coplanar with the surface S and is peened to further seal the pin 910 into the hole H. Various adhesive fluids may be utilized to further enhance the secure locking of the pin 910 within the hole H.

With reference now to FIG. 21, details of the formation of the counterbore 710 are shown. A spot facing bit 800 having a particularly formed cutting surface is utilized to form the counterbore 710. Particularly, the spot facing bit 800 includes an angled edge 802 having an angle which conforms to the slope τ of the thread relief 18 and a floor forming edge 804 having an angle which conforms substantially with the angle θ of the floor 714 of the counterbore 710. A portion of the spot facing bit 800 below the angled edge 802 is preferably not greater in diameter than a diameter of the hole H. Thus, when the spot facing bit 800 is lowered axially into the hole H, the angled edge 802 and floor forming edge 804 form the counterbore 710. A depth of the counterbore 710 is preferably controlled by some form of drill stop or other jig to prevent the counterbore 710 from passing too deeply into the hole H.

Alternatively, and shown in FIG. 22, a spot facing bit 810 can be used which has a cusp-cutting edge 814 and an angled edge 812 which form a cusped floor 716 within the counterbore 710. This cusped floor 716 can complement a geometry of a cusped pin 1010 (shown in FIGS. 23 through 25) which is similar in many ways to the pin 110 (FIG. 10).

The cusped pin 1010 includes a head 1020 and neck 1030 similar to that of the pin 910. However, the cusped pin 1010 has a shoulder 1012 with a bottom surface 1016 which exhibits an angle φ (FIG. 16) greater than 90°. When this cusped pin 1010 is utilized in a hole H having a counterbore 710 with a cusped floor 716, the shoulder 1012 and floor 716 can interface and cause further amplification of the crack closing force F' (FIG. 1), especially near the surface S. As shown in FIGS. 23 through 25, the cusped pin 1010 is preferably utilized similarly to the manner of use of the pin 910.

With reference now to FIGS. 26 through 28, details of the threading of the hole H are shown. As an alternative to the tapping bit 550 shown in FIG. 5, a series of taps 820, 830, 840 can be used to most effectively form the threads T within the hole H. Initially, a roughing tap 820 is passed axially into the hole H to form a first rough shape of the threads T. The roughing tap 820 is followed by a finishing tap 830 which completes formation of the threads T within an open hole H. If a hole H''' formed as a blind bore is to receive the pin 10, 110, 210, 310, 410, 610, 910, 1010, a bottom tap 840 can be utilized to fully form the threads T to within one thread T of a bottom of the hole H'''. By utilizing the three taps 820, 830, 840 in series, a more precisely threaded hole H, H''' can be formed with less damage to the taps 820, 830, 840.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A pin for location into a threaded hole for cold repair of a crack comprising, in combination:

a hole that straddles the crack in a material having a surface, the hole including a first curved wall on a first side of the crack and a second curved wall on a second side of the crack, said hole including hole threads therein with a major diameter and a minor diameter with a portion of each hole thread adjacent the major diameter closer to the surface than any other portion of the hole threads, a head on said pin including a means to transfer torque to said pin, a threaded shaft on said pin extending from said head along a central axis, and at least one of said shaft threads including a crest defining a major diameter of said threaded shaft, a root defining a minor diameter of said threaded shaft, and an upper surface extending from a bottom edge of said root to an upper edge of said crest, said upper surface having a portion thereof extending toward said crest at an angle greater than zero from a reference plane perpendicular to said central axis of said pin, and means for opposing central axis translation of said pin disposed on said pin and positioned to contact the material near the crack;

said pin is threaded into said hole, said central axis translation opposition means coacts with said threads of said hole and said threads of said pin and causes further rotation of said pin to force the first side of the crack and the second side of the crack together.

2. The combination of claim 1 wherein a neck is interposed between said head and said threaded shaft, said neck including means to sever said head from said threaded shaft when torsional forces are applied to said head which exceed a maximum torsional force for which said threads of said threaded shaft are designed to withstand.

3. The combination of claim 2 wherein said head severing means of said neck includes a crease having a lesser diameter than a diameter of said threaded shaft, such that said head will be sheared off at said crease of said neck before said pin is fractured through said threaded shaft, and wherein said central axis translation opposition means is a shoulder between said head and said threaded shaft, said shoulder having a greater diameter than a diameter of the hole.

4. The combination of claim 3 wherein said threads of said threaded shaft are sized such that a major diameter of said threads of said pin are slightly less than a major diameter of the threads of the hole, whereby when said pin is threaded into said hole a gap exists between the crest of the threads of the pin and a major diameter of the threads of the hole, thereby allowing said threads of said pin to slide along the threads of the hole causing the first curved wall and second curved wall of the hole to be drawn toward each other, and further drawing the first side of the crack and the second side of the crack toward each other.

5. The combination of claim 4 wherein said threads of said threaded shaft include said upper surface extending between said bottom edge of said root and said upper edge of said crest and a lower surface extending between a top edge of said root and a lower edge of said crest, said upper surface diverging at a constant upper surface angle from said reference plane orthogonal to said central axis of the pin by an angle not greater than a lower surface angle between the lower surface and the reference plane.

6. The combination of claim 5 wherein said upper surface angle is between five and forty-five degrees and said lower surface angle is between ten and seventy degrees.

7. The combination of claim 6 wherein said crest is constant distance from said central axis between said upper edge of said crest and said lower edge of said crest and wherein said root is a constant distance from said central axis at said top edge of said root and at said bottom edge of said root, whereby said threads of said threaded shaft are given an additional thickness and receive the threads of the hole of a greater thickness, thereby providing pin threads of greater strength for forcing the first side of the crack and the second side of the crack together without substantial distortion of the pin threads.

8. The combination of claim 7 wherein said threaded shaft is tapered such that a top of said threaded shaft has a greater diameter than a bottom of said threaded shaft distant from the head, whereby the pin is configured to fit within a threaded hole having a tapered inner surface.

9. The combination of claim 8 wherein said shoulder is a frustum with a lesser diameter portion adjacent the threaded shaft and similar in diameter to said minor diameter and the greater diameter portion of said frustum adjacent said neck and having a diameter greater than a major diameter of said threaded shaft, whereby when said pin is threaded into the hole the shoulder impacts the surface of the material prohibiting, the pin from translating further along said central axis and causing further rotation of the pin to draw the first side of the crack and the second side of the crack together.

10. The combination of claim 7 wherein said shoulder includes a cusp defined by a greater diameter portion of the shoulder being further from the head of the pin than a lesser diameter portion of the shoulder and with the lesser diameter portion adjacent said top of the threaded shaft, whereby when said pin is threaded into the hole said greater diameter portion of the shoulder impacts the surface before said lesser diameter portion impacts the surface, allowing said cusp to impact and engage the surface, providing a seal surrounding the hole.

11. The combination of claim 3 wherein said shoulder includes a bottom wall, said bottom wall oriented substantially perpendicular to said central axis of said pin and having a periphery wider than a width of the hole, whereby when said pin is oriented sufficiently deep within the hole, said bottom wall of said shoulder will abut the material without exerting a spreading force on the crack.

12. The combination of claim 11 wherein a frustum is oriented between said shoulder and said threaded shaft, said frustum having a greater diameter circular end adjacent said shoulder and a lesser diameter circular end adjacent said threaded shaft, said frustum having sufficient height to allow a thread forming tool to pass between said shoulder and an uppermost end of said threads during formation of said pin.

\* \* \* \* \*

UNITED STATES PATENT AND TRADEMARK OFFICE
CERTIFICATE OF CORRECTION

PATENT NO.    : 5,499,892
DATED         : March 19, 1996
INVENTOR(S)   : Reed, G.

Page 1 of 1

It is certified that error appears in the above-identified patent and that said Letters Patent is hereby corrected as shown below:

<u>Column 13,</u>
Line 63, kindly change "21" to -- 22 --.

<u>Column 14,</u>
Line 13, kindly change "22" to -- 21 --.

Signed and Sealed this

Twelfth Day of November, 2002

*Attest:*

*Attesting Officer*

JAMES E. ROGAN
*Director of the United States Patent and Trademark Office*